(12) United States Patent
Abukawa et al.

(10) Patent No.: US 12,215,402 B2
(45) Date of Patent: Feb. 4, 2025

(54) HOT-ROLLED STEEL SHEET

(71) Applicant: NIPPON STEEL CORPORATION, Tokyo (JP)

(72) Inventors: Genki Abukawa, Tokyo (JP); Masafumi Azuma, Tokyo (JP); Eisaku Sakurada, Tokyo (JP); Shohei Yabu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 414 days.

(21) Appl. No.: 17/784,901

(22) PCT Filed: Dec. 15, 2020

(86) PCT No.: PCT/JP2020/046637
§ 371 (c)(1),
(2) Date: Jun. 13, 2022

(87) PCT Pub. No.: WO2021/131876
PCT Pub. Date: Jul. 1, 2021

(65) Prior Publication Data
US 2023/0002848 A1    Jan. 5, 2023

(30) Foreign Application Priority Data
Dec. 23, 2019   (JP) ................. 2019-231744

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS

2010/0104891 A1    4/2010 Nakagaito et al.
2012/0009434 A1    1/2012 Hata et al.
(Continued)

FOREIGN PATENT DOCUMENTS

JP    2008-266778 A    11/2008
JP    2010-37652 A    2/2010
(Continued)

OTHER PUBLICATIONS

Takahashi, "Development of High Strength Steels for Automobiles", Nippon Steel Technical Report, 2003, No. 378, pp. 2-6.

Primary Examiner — Christopher S Kessler
(74) Attorney, Agent, or Firm — Birch, Stewart, Kolasch & Birch, LLP

(57) ABSTRACT

This hot-rolled steel sheet has a predetermined chemical composition, a microstructure includes 80% or more of tempered martensite by a volume percentage and a remainder consisting of one or more of ferrite, pearlite, bainite, fresh martensite, and residual austenite, the tempered martensite includes $5\times10^9$ pieces/mm$^3$ or more of precipitates containing Ti and having an equivalent circle diameter of 5 nm or less per unit volume, in a surface layer region that is a range from a surface to a ⅒ position of a sheet thickness, a sum of an average pole density of a crystal orientation
(Continued)

group consisting of {211}<111> to {111}<112> and a pole density in a crystal orientation of {110}<001> is 6.0 or less, and a tensile strength is 980 MPa or more.

19 Claims, 1 Drawing Sheet

(51) Int. Cl.
| | |
|---|---|
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/16* | (2006.01) |
| *C22C 38/24* | (2006.01) |
| *C22C 38/26* | (2006.01) |
| *C22C 38/28* | (2006.01) |
| *C22C 38/38* | (2006.01) |

(52) U.S. Cl.
CPC ............ *C21D 6/005* (2013.01); *C21D 6/008* (2013.01); *C21D 8/0205* (2013.01); *C21D 8/0226* (2013.01); *C22C 38/001* (2013.01); *C22C 38/002* (2013.01); *C22C 38/005* (2013.01); *C22C 38/02* (2013.01); *C22C 38/06* (2013.01); *C22C 38/08* (2013.01); *C22C 38/16* (2013.01); *C22C 38/24* (2013.01); *C22C 38/26* (2013.01); *C22C 38/28* (2013.01); *C22C 38/38* (2013.01); *C21D 2211/008* (2013.01)

(56) References Cited

U.S. PATENT DOCUMENTS

| | | | |
|---|---|---|---|
| 2012/0031528 | A1 | 2/2012 | Hayashi et al. |
| 2013/0167985 | A1 | 7/2013 | Saito et al. |
| 2013/0323112 | A1 | 12/2013 | Okamoto et al. |
| 2014/0090755 | A1 | 4/2014 | Ueda et al. |
| 2018/0100213 | A1 | 4/2018 | Tanaka et al. |
| 2019/0112681 | A1 | 4/2019 | Nakagaito et al. |
| 2019/0161820 | A1 | 5/2019 | Sakakibara et al. |
| 2019/0249282 | A1 | 8/2019 | Nakano et al. |
| 2019/0309398 | A1 | 10/2019 | Sano et al. |
| 2020/0157666 | A1 | 5/2020 | Sakakibara et al. |
| 2021/0095356 | A1 | 4/2021 | Yokoyama et al. |
| 2021/0140005 | A1 | 5/2021 | Yoshida et al. |
| 2021/0404040 | A1* | 12/2021 | Abukawa ............ C22C 38/002 |
| 2022/0025499 | A1* | 1/2022 | Yoshida ................ C22C 38/005 |

FOREIGN PATENT DOCUMENTS

| | | |
|---|---|---|
| JP | 2012-62558 A | 3/2012 |
| JP | 2012-77336 A | 4/2012 |
| JP | 2012-214891 A | 11/2012 |
| JP | 2013-133499 A | 7/2013 |
| JP | 2018-80378 A | 5/2018 |
| WO | WO 2010/137317 A1 | 12/2010 |
| WO | WO 2012/121219 A1 | 9/2012 |
| WO | WO 2018/026013 A1 | 2/2018 |
| WO | WO 2018/033960 A1 | 2/2018 |
| WO | 2018/142450 A1 | 8/2018 |
| WO | WO 2019/009410 A1 | 1/2019 |
| WO | 2019/186997 A1 | 10/2019 |

\* cited by examiner

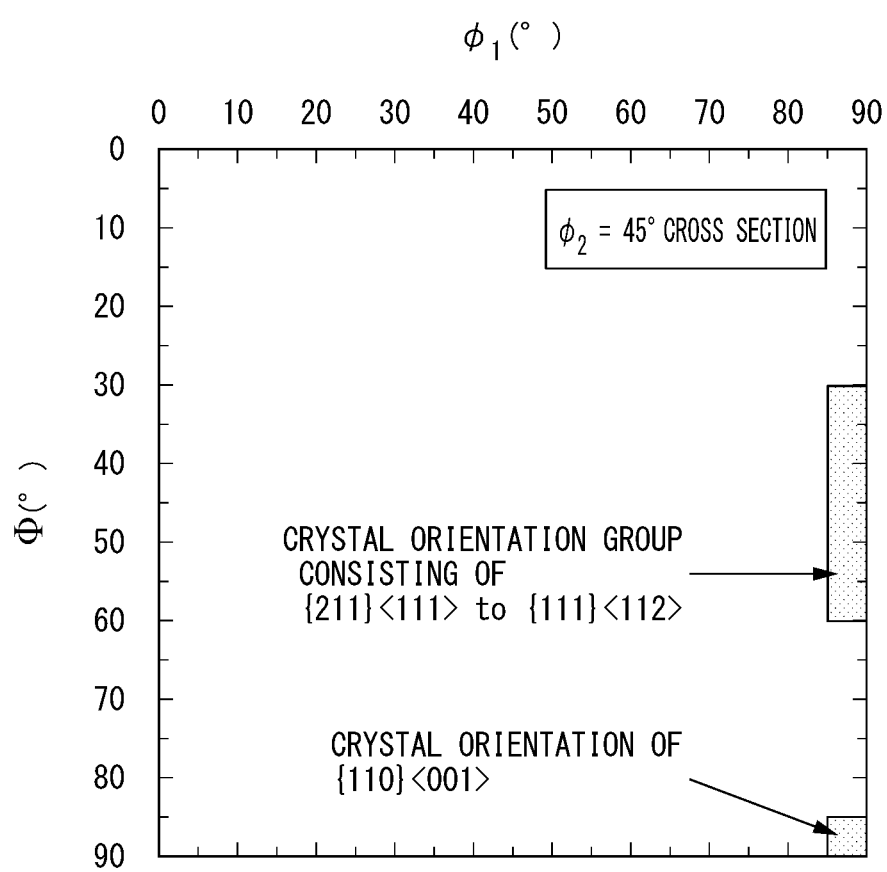

HOT-ROLLED STEEL SHEET

TECHNICAL FIELD OF THE INVENTION

The present invention relates to a hot-rolled steel sheet.

Priority is claimed on Japanese Patent Application No. 2019-231744, filed in Japan on Dec. 23, 2019, the content of which is incorporated herein by reference.

RELATED ART

In recent years, from the viewpoint of regulations for greenhouse gas emission in association with global warming countermeasures, there has been a demand for additional improvement in the fuel efficiency of vehicles. In addition, in order to reduce the weights of vehicle bodies and secure collision safety, the application of high strength steel sheets to components for a vehicle is becoming increasingly widespread.

However, for steel sheets that are used for components for a vehicle, not only strength but also a variety of workability that is required at the time of forming components such as press formability or weldability are required. Specifically, from the viewpoint of press workability and formability, bending workability and stretch flangeability are often required for steel sheets. However, since the formability of steel sheets tends to deteriorate with the high-strengthening of the materials, it is difficult to achieve both a high strength and favorable formability.

Therefore, for the application of high strength steel sheets to components for a vehicle, it has become an important issue to realize excellent bending workability and stretch flangeability together with a high strength of a tensile strength of 980 MPa or more.

In addition, from the viewpoint of the resistance of components for a vehicle to distortion at the time of collision, a high proof stress is also required, and there is a desire for steel sheets to have a high proof stress in addition to the above-described formability.

It is reported in Non-Patent Document 1 that bending workability is improved by controlling the structure to a single structure of ferrite, bainite, martensite, or the like by microstructure control.

Patent Document 1 discloses a method for realizing a tensile strength of 590 MPa or more and 750 MPa or less and excellent bending workability by controlling a steel sheet containing, by mass %, 0.010% to 0.055% of C, 0.2% or less of Si, 0.7% or less of Mn, 0.025% or less of P, 0.02% or less of S, 0.01% or less of N, 0.1% or less of Al, and 0.06% to 0.095% of Ti, controlling a structure including 95% or more of ferrite by an area ratio and controlling the diameters of carbide particles containing Ti in ferrite crystal grains and the structure to a structure in which only TiS having an average diameter of 0.5 μm or less is dispersed and precipitated as a sulfide containing Ti.

Patent Document 2 discloses a method for improving bending workability while maintaining a tensile strength of 780 MPa or more by, for a steel sheet containing, by mass %, 0.05% to 0.15% of C, 0.2% to 1.2% of Si, 1.0% to 2.0% of Mn, 0.04% or less of P, 0.0030% or less of S, 0.005% to 0.10% of Al, 0.01% or less of N, and 0.03% to 0.13% of Ti, controlling the structure inside the steel sheet to a bainite single phase or a structure including bainite in a fraction of more than 95% and setting, in the structure of the sheet surface layer area, bainite to a fraction of less than 80% and ferrite that is rich in workability to a fraction of 10% or more.

Furthermore, Patent Document 3 discloses that a high strength hot-rolled steel sheet having a high strength of a yield strength of 960 MPa or more and excellent bending workability and being excellent in terms of low temperature toughness can be obtained by making the steel sheet contain, by mass %, 0.08% to 0.25% of C, 0.01% to 1.0% of Si, 0.8% to 1.5% of Mn, 0.025% or less of P, 0.005% or less of S, 0.005% to 0.10% of Al, 0.001% to 0.05% of Nb, 0.001% to 0.05% of Ti, 0.1% to 1.0% of Mo, and 0.1% to 1.0% of Cr and controlling the structure to a structure in which a tempered martensite is a primary phase with a volume percentage of 90% or more, the average grain size of prior austenite grains in a cross section parallel to a rolling direction is 20 μm or less, the average grain size of prior austenite grains is 15 μm or less in a cross section orthogonal to the rolling direction, and the anisotropy of the prior γ grains is reduced.

Patent Document 4 discloses that a hot-rolled steel sheet having excellent local deformability and a small anisotropy in bending workability can be obtained by controlling the pole density in each orientation of a specific crystal orientation group at the center portion in the sheet thickness direction, which is a range of ⅝ to ⅜ of the sheet thickness from the sheet surface and setting rC, which is the Lankford value in a direction perpendicular to a rolling direction, to 0.70 or more and 1.10 or less and r30, which is the Lankford value in a direction at an angle of 30° with respect to the rolling direction, to 0.70 or more and 1.10 or less.

On the other hand, as a manufacturing method for obtaining a hot-rolled steel sheet having a high proof stress, Patent Documents 5 and 6 propose a method for obtaining a high strength and a high proof stress by annealing hot-rolled steel sheets.

However, no documents disclose a method for achieving a high strength of a tensile strength of 980 MPa or more and excellent bending workability, stretch flangeability, and high proof stress at the same time.

PRIOR ART DOCUMENT

Patent Document

[Patent Document 1] Japanese Unexamined Patent Application, First Publication No. 2013-133499
[Patent Document 2] Japanese Unexamined Patent Application, First Publication No. 2012-62558
[Patent Document 3] Japanese Unexamined Patent Application, First Publication No. 2012-77336
[Patent Document 4] PCT International Publication No. WO 2012/121219
[Patent Document 5] PCT International Publication No. WO 2018/026013
[Patent Document 6] PCT International Publication No. WO 2010/137317

Non-Patent Document

[Non-Patent Document 1] Takahashi et al., Nippon Steel Technical Report, "Development of High Strength Steels for Automobiles", No. 378, p. 2 to p. 6, (2003).

DISCLOSURE OF THE INVENTION

Problems to be Solved by the Invention

The present invention is a variety of forms shown below, which have been conceived in view of the above-described studies, and an object of the present invention is to provide a hot-rolled steel sheet having a tensile strength of 980 MPa or more, being excellent in terms of bending workability and stretch flangeability, and having a high proof stress.

Means for Solving the Problem

The present inventors studied the above-described object. As a result, it was found that, in a steel sheet having a predetermined chemical composition, when the microstructure is made into a structure including 80% or more of tempered martensite, and the microstructure includes $5 \times 10^9$ pieces/mm$^3$ or more of precipitates containing Ti and having an equivalent circle diameter of 5 nm or less per unit volume, it is possible to manufacture a steel sheet having a high proof stress and a tensile strength of 980 MPa or more while ensuring workability.

In addition, the present inventors intensively investigated the bending workability of high strength steel sheets. As a result, it was clarified that, as the strength of a steel sheet increases, cracks are more likely to be initiated from the inside bend during bending (hereinafter, referred to as "inside bend cracks"). In addition, regarding cracking during the bending of a steel sheet, conventionally, it is usual that cracks are initiated from the surface of the steel sheet on the outside bend or the vicinity of the end surface, but it was found that, in association with the high-strengthening of steel sheet, there is a case where minute cracks are initiated on the inside bend. From conventional knowledge, no method for suppressing such minute cracks that are initiated in the inside bend has been found.

From research by the present inventors, it was found that the inside bend cracks are likely to be initiated in steel sheets having a tensile strength of 780 MPa class or higher, becomes significant in steel sheets having a tensile strength of 980 MPa class or higher, and becomes a more significant problem in steel sheets having a tensile strength of 1180 MPa class or higher.

The present inventors presumed that the mechanism of the initiation of the above-described inside bend cracks is attributed to the bias of distortion and examined a method for suppressing the inside bend cracks with attention paid to texture and uniformity of hardness.

As a result, it was found that, when the texture is relatively random, deformation resistance is also uniform, and thus distortion is likely to occur uniformly; however, when a specific texture develops, bias of distortion is caused between crystals having an orientation with large deformation resistance and crystals having the other orientations and a shear deformation band is likely to be generated, and, conversely, when crystals having an orientation with large deformation resistance are reduced, distortion occurs uniformly and the shear deformation band is less likely to be generated. That is, the present inventors found that the inside bend cracks can be suppressed by controlling the texture particularly in the surface layer region in the sheet thickness direction where cracks are initiated.

As a result of additional studies by the present inventors, it was found that the bias of distortion also results from non-uniformity of hardness in addition to the texture. The non-uniformity of hardness is caused by the distribution of a transformation structure or a precipitate. The present inventors found that the non-uniformity of hardness, which acts as a cause for the inside bend cracks (cause for the deterioration of bending workability) can be evaluated with the standard deviation of nanohardness. That is, it was found that the effect on improvement in bending workability becomes stronger by further controlling the uniformity of hardness in addition to the control of the texture. In addition, it was found that the control of the uniformity of hardness also contributes to additional improvement in stretch flangeability.

The present invention has been made based on the above-described findings, and the gist of the present invention is as follows.

(1) A hot-rolled steel sheet according to one aspect of the present invention containing, as a chemical composition, by mass %, C: 0.02% to 0.12%, Si: 0.01% to 2.00%, Mn: 1.00% to 3.00%, P: 0.100% or less, S: 0.010% or less, N: 0.010% or less, Al: 0.005% to 1.000%. Ti: 0.01% to 0.20%, Nb: 0% to 0.10%, V: 0% to 0.100%, Ni: 0% to 2.00%, Cu: 0% to 2.00%, Cr: 0% to 2.00%, Mo: 0% to 2.00%, W: 0% to 0.100%, B: 0% to 0.0100%, REM: 0% to 0.0300%, Ca: 0% to 0.0300%, Mg: 0% to 0.0300%, and a remainder of Fe and impurities, in which the chemical composition satisfies 0.10≤Ti+Nb+V≤0.45, a microstructure includes 80% or more of tempered martensite by a volume percentage and a remainder consisting of one or more of ferrite, pearlite, bainite, fresh martensite, and residual austenite, the tempered martensite includes $5 \times 10^9$ pieces/mm$^3$ or more of precipitates containing Ti and having an equivalent circle diameter of 5 nm or less per unit volume, in a surface layer region that is a range from a surface to a 1/10 position of a sheet thickness, a sum of an average pole density of a crystal orientation group consisting of {211}<111> to {111}<112> and a pole density in a crystal orientation of {110}<001> is 6.0 or less, and a tensile strength is 980 MPa or more.

(2) The hot-rolled steel sheet according to (1) may contain, as the chemical composition, by mass %, one or more selected from Nb: 0.01% to 0.10%, V: 0.010% to 0.100%, Ni: 0.01% to 2.00%, Cu: 0.01% to 2.00%, Cr: 0.01% to 2.00%, Mo: 0.01% to 2.00%. W: 0.005% to 0.100%. B: 0.0005% to 0.0100%, REM: 0.0003% to 0.0300%, Ca: 0.0003% to 0.0300%, and Mg: 0.0003% to 0.0300%.

(3) The hot-rolled steel sheet according to (1) or (2), in which the tempered martensite may include $5 \times 10^{11}$ pieces/mm$^3$ or more of the precipitates per unit volume, and the tensile strength may be 1180 MPa or more.

(4) The hot-rolled steel sheet according to any one of (1) to (3), in which a standard deviation of nanohardness at a 1/4 position of the sheet thickness from the surface may be 0.8 GPa or less.

(5) The hot-rolled steel sheet according to any one of (1) to (4) may include a hot-dip galvanized layer on the surface.

(6) The hot-rolled steel sheet according to (5), in which the hot-dip galvanized layer may be a hot-dip galvannealed layer.

Effects of the Invention

According to the above-described aspect of the present invention, it is possible to obtain a hot-rolled steel sheet that has a tensile strength of 980 MPa or more, is capable of suppressing the initiation of inside bend cracks, is excellent in terms of bending workability and stretch flangeability, and furthermore, has a high proof stress (the proportion of proof stress in tensile strength is high).

BRIEF DESCRIPTION OF THE DRAWINGS

FIG. 1 is a diagram showing crystallite orientation distribution functions (ODF) at a φ2=45° cross section, a crystal orientation group consisting of {211}<111> to {111}<112> and a {110}<001> orientation.

EMBODIMENTS OF THE INVENTION

Hereinafter, a hot-rolled steel sheet according to an embodiment of the present invention (the steel sheet according to the present embodiment) will be described.

1. Microstructure

<Microstructure Including 80% or More of Tempered Martensite by Volume Percentage and Remainder Consisting of One or More of Ferrite, Bainite, Pearlite, Fresh Martensite, and Residual Austenite>

First, the reasons for limiting the microstructure will be described.

In the steel sheet according to the present embodiment, a primary phase of the microstructure is 80% or more of tempered martensite by a volume percentage.

The steel sheet according to the present embodiment needs to be mainly made of a microstructure having as similar hardness as possible from the viewpoint of improving the stretch flangeability and the bending workability. When the fact that the hardness of individual microstructures increases in the order of approximately ferrite<pearlite<bainite<residual austenite<tempered martensite<fresh martensite is taken into account, in a case where the steel sheet includes ferrite, pearlite, bainite, or residual austenite as the primary phase, the tensile strength (TS) becomes less than 980 MPa. In addition, when fresh martensite included as the primary phase, there is a possibility that fresh martensite may act as a cause for a low proof stress. Therefore, in the steel sheet according to the present embodiment, tempered martensite is included as a primary phase. When the volume percentage of the tempered martensite is less than 80%, the hardness becomes non-uniform due to the difference in hardness between the other structures and the tempered martensite, and the bending workability and the stretch flangeability deteriorate.

Therefore, the volume percentage of the tempered martensite is set to 80% or more. The structure other than the tempered martensite (remainder) is one or more of ferrite, pearlite, bainite, residual austenite, and fresh martensite. Particularly, the volume percentage of fresh martensite is preferably 10% or less.

In the present embodiment, regarding the volume percentages of pearlite, bainite, tempered martensite, and ferrite, a sample is collected such that a sheet thickness cross section parallel to a rolling direction of the hot-rolled steel sheet serves as an observed section, the observed section is polished and Nital-etched, a range of ⅛ to ⅜ of the sheet thickness (⅛ thickness to ⅜ thickness) from the surface in which a position of a ¼ depth (¼ thickness) of the sheet thickness from the surface is centered is observed using a field emission scanning electron microscope (FE-SEM) at a magnification of 5000 times, the area ratio of each structure is measured, and the area ratio is regarded as the volume percentage. At that time, the area ratios are measured at 10 visual fields, and the average value thereof is regarded as the volume percentage.

Each structure has the following characteristics. Therefore, in the measurement of the area ratio, each structure is identified based on the following characteristics, and the area ratio is obtained.

Ferrite is equiaxed grains containing no iron-based carbides, and pearlite is a layered structure of ferrite and cementite.

Bainite includes upper bainite and lower bainite, and the upper bainite is a aggregation of lath-shaped crystal grains and an aggregate of laths containing a carbide between the laths. The lower bainite is a aggregation of lath-shaped crystal grains and contains an iron-based carbide having a major axis of 5 nm or more therein, and the carbide belongs to a single variant, that is, a group of iron-based carbides elongated in the same direction. Here, the group of iron-based carbides elongated in the same direction means that the difference in the elongation direction of the iron-based carbide group is within 5°.

Tempered martensite is a aggregation of lath-shaped crystal grains and contains an iron-based carbide with a major axis of 5 nm or more therein, and the carbide belongs to a plurality of variants, that is, a group of iron-based carbides elongated in two or more directions. Usually, tempered martensite refers to structures containing an iron-based carbide such as cementite in many cases; however, in the present embodiment, martensite including a fine precipitate containing Ti is also defined as tempered martensite.

Fresh martensite and residual austenite are not sufficiently etched by Nital etching and thus can be clearly distinguished from the above-described structures (ferrite, pearlite, bainite, and tempered martensite) in the observation with the lFE-SEM. Therefore, the volume percentage of the fresh martensite can be obtained as a difference between the volume percentage obtained as the area ratio of a non-etched region that is observed with the FE-SEM and the volume percentage of residual austenite measured with X-rays described below.

The volume percentage of the residual austenite is obtained by an X-ray diffraction method. Specifically, in a cross section parallel to the rolling direction at the ¼ depth position of the sheet thickness of the steel sheet, the integrated intensities of a total of six peaks of $\alpha(110)$, $\alpha(200)$, $\alpha(211)$, $\gamma(111)$, $\gamma(200)$, and $\gamma(220)$ are obtained using Co-K$\alpha$ rays, and the volume percentage of the residual austenite is obtained by calculation using an intensity averaging method.

<Tempered Martensite Including $5\times10^9$ Pieces/Mm$^3$ or More of Precipitates Containing Ti and Having Equivalent Circle Diameter of 5 nm or Less Per Unit Volume>

The steel sheet according to the present embodiment includes tempered martensite as a main structure as described above; however, in order to reduce non-uniformity of hardness or the like between these microstructures as much as possible, the steel sheet is hot-rolled to have a martensite (tempered martensite and fresh martensite) structure, and then a treatment is performed to reduce the hardness difference between the tempered martensite regions by a heat treatment at 450° C. or higher. At this time, since tempering is accompanied by a decrease in strength, precipitation hardening is performed by finely dispersing precipitates.

The present inventors intensively investigated the relationship between the sizes and number density of the precipitates that enables a tensile strength of 980 MPa or more to be secured. As a result, it was found that, when tempered martensite including $5\times10^9$ pieces/mm$^3$ or more of precipitates containing Ti and having an equivalent circle diameter of 5 nm or less in terms of the number density is included as a primary phase, a tensile strength of 980 MPa or more can be secured. In addition, it was found that, regarding precipitates included in the conventional hot-rolled steel sheets (for example, the steel sheets of Patent Documents 5 and 6), the sizes (equivalent circle diameters) could not be controlled to 5 nm or less, and the number density was also small.

As a result of additional studies by the present inventors, the causes therefor were found to be the fact that the amount of Ti or the like that formed the precipitates was small or, even when contained, Ti or the like was present as coarse precipitates in a slab stage and did not dissolve even during the heating of the slab and the fact that TIC precipitated by a long time of a heat treatment such as coiling after hot rolling (hot rolling) became coarse and thus the number density of precipitates with an equivalent circle diameter of 5 nm or less became less than $5 \times 1$ pieces/mm$^3$.

Dispersing fine precipitates as described above contributes not only to improvement in the tensile strength, but also to improvement in uniformity of hardness (reduction of non-uniformity) or improvement in proof stress.

In addition, usually, it is difficult to achieve both a high proof stress and favorable bendability, but both a high proof stress and favorable bendability can be achieved by controlling the sizes and number density of precipitates and controlling the texture to be described below at the same time.

The reasons for limiting the sizes and number density of the precipitates will be described.

The number density per unit volume of the precipitates containing Ti and having an equivalent circle diameter of 5 nm or less is set to $5 \times 10^9$ pieces/mm$^3$ or more in order to secure a tensile strength of 980 MPa or more. When the number density is less than $5 \times 10^9$ pieces/mm$^3$, it is difficult to secure a tensile strength of 980 MPa or more. Therefore, the number density of the precipitates containing Ti and having an equivalent circle diameter of 5 nm or less needs to be set to $5 \times 10^9$ pieces/mm$^3$ or more. In order to secure a tensile strength of 1180 MPa or more, the number density of the precipitates is preferably set to $5 \times 10^{11}$ pieces/mm$^3$ or more. "5 nm" mentioned herein is an equivalent circle diameter.

The reason for defining the precipitates as precipitates containing Ti is that precipitates containing Ti are easily dissolved in a large amount in a slab heating stage before hot rolling and are precipitated as fine precipitates having an equivalent circle diameter of 5 nm or less. The type of the precipitates is not limited and may be a carbide, a nitride, a carbonitride, or the like, but is particularly preferably a carbide since the carbide is precipitated as fine precipitates having an equivalent circle diameter of 5 nm or less and contributes to improvement in strength. Ti precipitates are mainly included in the tempered martensite, which is the primary phase.

Nb also has a similar effect to Ti, but carbides of Nb can be dissolved in the slab heating stage only in a small amount, and, even when Nb is singly contained, a tensile strength of 980 MPa or more cannot be secured. In addition, V can be dissolved in a large amount in the slab heating stage, the sizes of precipitates are relatively large, and, even when V is singly contained, it is difficult to secure $5 \times 10^9$ pieces/mm$^3$ or more of precipitates of 5 nm or less. Due to these facts, the precipitates need to be precipitates containing Ti. However, the precipitate may be a composite precipitate having a structure in which some of Ti is substituted with Nb, V and/or Mo ((Ti, Nb, V)C or the like) as long as $5 \times 10^9$ pieces/mm$^3$ or more of precipitates of 5 nm or less can be secured.

The reason for setting the sizes of the precipitates, which are controlled together with the above-described number density to 5 nm or less in terms of the equivalent circle diameter is to secure a tensile strength of 980 MPa or more. For precipitates having an equivalent circle diameter of more than 5 nm, it is not possible to set the number density to $5 \times 10^9$ pieces/mm$^3$ or more, and it is not possible to secure a tensile strength of 980 MPa or more.

In the steel sheet according to the present embodiment, the strength of the steel sheet is improved by utilizing precipitation hardening. Therefore, softening in a heat-affected zone, which has been a problem at the time of welding such as arc welding, can be suppressed, and the fatigue strength of a weld is also excellent. In addition, in the steel sheet according to the present embodiment, the strength is increased by the precipitates containing Ti and having an equivalent circle diameter of 5 nm or less. In such a case, the yield ratio (=YS/TS), which is the ratio of the yield strength (YS) to the tensile strength (TS), becomes as extremely high as 0.90 or more. The use of a steel sheet having a high yield ratio makes it possible to provide suspension components for vehicles that are not easily distorted at the time of driving over curb or collision.

Regarding the number density of the precipitates containing Ti, the number densities of precipitates that are included per unit volume of the steel sheet are measured using an electrolytic extraction residual method for individual equivalent circle diameters at pitches of 1.0 nm (for example, in a manner of the number density for equivalent circle diameters of more than 0 nm and 1.0 nm or less, the number density for equivalent circle diameters of more than 1.0 nm and 2.0 nm or less, and the number density for equivalent circle diameters of more than 2.0 nm and 3.0 nm or less . . . ). As a result of the measurement, the total of the number densities for more than 0 nm to 5.0 nm or less is defined as the number density of the precipitates having an equivalent circle diameter of 5 nm or less in the present embodiment. The number density of the precipitates is desirably collected from a range of 0.20 mm to a ⅜ thickness in the depth direction from the surface, from which the typical structure of the steel sheet can be obtained, for example, the vicinity of a ¼ position of the sheet thickness (¼ thickness) from the surface. The center of the sheet thickness is not preferable as the measurement position since there is a case where a coarse precipitate is present due to the influence of center segregation and the chemical composition locally differs due to the influence of segregation. Positions less than 0.20 mm from the surface are affected by high-density dislocation introduced by light rolling reduction or the like or decarburization during heating, which makes the number density of the precipitates differ from the number density in the inside, and are thus not preferable as the measurement position.

At the time of measurement, it is preferable to analyze the compositions of precipitates with a transmission electron microscope (TEM) and EDS to confirm that fine precipitates are precipitates containing Ti.

In the steel sheet according to the present embodiment, almost all fine precipitates are considered to be present in the tempered martensite. Therefore, in the present embodiment, the number density of the precipitates containing Ti and having an equivalent circle diameter of 5 nm or less obtained by the above-described method is regarded as the number density of the precipitates containing Ti and having an equivalent circle diameter of 5 nm or less that are included in the tempered martensite.

<In Surface Layer Region that is Range from Surface to ¹/₁₀ Position of Sheet Thickness, Sum of Average Pole Density of Crystal Orientation Group Consisting of {211}<111> to {111}<112> and Pole Density in Crystal Orientation of {110}<001> being 6.0 or Less>

In the steel sheet according to the present embodiment, in a surface layer region that is a range from the surface of the steel sheet to a ¹⁄₁₀ position of the sheet thickness, the sum of the average pole density of a crystal orientation group consisting of {211}<111> to {111}<112> and the pole density in a crystal orientation of {110}<001> is 6.0 or less.

As a result of intensive investigation regarding the bending workability of high strength steel sheets, the present Inventors found that there is a case where minute cracks are initiated in inside bends in association with the high-strengthening of the steel sheets. As a result of additional studies, the mechanism of such inside bend cracks is presumed as follows.

At the time of bending, compressive stress is generated in the inside bend. In the beginning, the working proceeds while the entire inside bend is uniformly distorted; however, as the amount of the working increases, distortion becomes too significant to be carried by uniform distortion alone, and microscopic bias of distortion is caused (the generation of a shear deformation band). As this shear deformation band further grows, cracks are initiated along the shear band from the surface of the inside bend and propagates. It is presumed that the reason for the inside bend cracks to be more likely to be initiated in association with high-strengthening is that deterioration of work hardening capability in association with high-strengthening makes it difficult for uniform distortion to proceed and makes it easy for bias of distortion to be caused, which generates a shear deformation band at an early stage of the working (or under loose working conditions).

When the steel sheet is bent and deformed, the strain increases toward the surface with the center of the sheet thickness as the boundary, and the strain becomes maximum at the outermost surface. Therefore, cracks of inside bend cracks are initiated on the surface of the steel sheet. Since it is the structure of the surface layer region that is a region from the surface of the steel sheet to ¹⁄₁₀ of the sheet thickness to contribute to such initiation of cracks, the structure of the surface layer region is controlled.

The present inventors paid attention to the texture in order to suppress the bias of distortion that acts as the cause for the inside bend cracks during bending.

Specifically, when the steel sheet is distorted, the responsiveness of a slip system against distortion in each crystal orientation differs (Schmid factor). This is considered to be because deformation resistance differs in each crystal orientation. That is, when the texture is relatively random, the deformation resistance is also uniform, and thus distortion is likely to occur uniformly; however, when a specific texture develops, bias of distortion is caused between crystals having an orientation with large deformation resistance and crystals having the other orientations and a shear deformation band is likely to be generated. Conversely, it is considered that, when crystals having an orientation with large deformation resistance are reduced, distortion occurs uniformly, and the shear deformation band is less likely to be generated.

In the steel sheet according to the present embodiment, based on the above-described idea, in a surface layer region that is a range from the surface of the steel sheet to a ¹⁄₁₀ position of the sheet thickness, the sum of the average pole density of a crystal orientation group consisting of {211}<111> to {111}<112> and the pole density in a crystal orientation off{110}<001> is set to 6.0 or less. This makes it possible to suppress the inside bend cracks.

In the case of a steel sheet where development of texture differs on the front and back surfaces, if the texture that is specified in the present embodiment is satisfied even in a range from the surface on one side to the ¹⁄₁₀ position of the sheet thickness alone, it is possible to obtain the inside bend crack suppression effect in bending where the surface becomes the inside bend.

The crystal orientation group consisting of {211}<111> to {111}<112> and the crystal orientation of {110}<001> are orientations that easily develop in the surface layer regions of high-strength hot-rolled steel sheets manufactured by a common method. In addition, these orientations are crystal orientation groups where deformation resistance is particularly large in inside bends during bending, and thus a shear deformation band is likely to be generated due to a difference in deformation resistance from other crystal orientation groups. Therefore, the inside bend cracks can be suppressed by reducing the pole densities of these crystal orientation groups. Here, when only any one of the average pole density of the crystal orientation group consisting of {211}<111> to {111}<112> and the pole density in the crystal orientation of {110}<001> is reduced, the effect of the present embodiment cannot be obtained, and it is important to reduce the sum thereof.

When the sum of the average pole density of the crystal orientation group consisting of {211}<111> to {111}<112> and the pole density in the crystal orientation of {110}<001> is more than 6.0 in the surface layer region that is a range from the surface of the steel sheet to the ¹⁄₁₀ position of the sheet thickness, the shear deformation band is significantly likely to be generated, which acts as a cause for the initiation of inside bend cracks. In this case, R/t, which is the average value of the minimum bend radii in an L axis and in a C axis/the sheet thickness, exceeds 1.5. Therefore, the sum thereof is set to 6.0 or less. From this viewpoint, the sum of the average pole density of the crystal orientation group consisting of {211}<111> to {111}<112> and the pole density in the crystal orientation of {110}<001> is preferably 5.0 or less and more preferably 4.0 or less.

The sum of the average pole density of the crystal orientation group consisting of {211}<111> to {111}<112> and the pole density in the crystal orientation of {110}<001> is preferably as small as possible, but it is difficult to set the sum to less than 0.5 in high-strength hot-rolled steel sheets of 980 MPa or more, and thus the practical lower limit is 0.5.

The pole density can be measured by an electron backscatter diffraction pattern (EBSP) method. In a sample to be subjected to analysis by the EBSP method, a cut surface parallel to the rolling direction and perpendicular to the sheet surface is mechanically polished, and strain is removed by chemical polishing, electrolytic polishing, or the like after the mechanical polishing. Using this sample, the measurement intervals are set to 4.0 μm in the range from the surface of the steel sheet to the ¹⁄₁₀ position of the sheet thickness, and the analysis by the EBSP method is performed such that the measurement area becomes 150000 μm² or larger.

FIG. 1 shows crystallite orientation distribution functions (ODF) at a φ2=45° cross section, the crystal orientation group consisting of {211}<111> to {111}<112>, and the orientation {110}<001>. The crystal orientation group consisting of {211}<111> to {111}<112> refers to a range where the texture analysis is Bunge-expressed and the crystallite orientation distribution functions (ODF) at the φ2=45° cross section are φ1=85° to 90°, Φ=30° to 60°, and φ2=45°. The average pole density of this crystal orientation group is calculated in the above-described range shown in FIG. 1. Strictly speaking, the {211}<111> to {111}<112> crystal orientation group is a range of φ1=90°, Φ=30° to 60°, and φ2=45° on ODF. However, since there is a measurement error arising from test piece working or sample setting, in the steel sheet according to the present embodiment, the average pole density is calculated in a range of φ1=850 to 90, Φ=30° to 60°, and φ2=45°. In the following average pole density analyses as well, angular ranges from which the average value is taken are determined in the same manner in consideration of a measurement error arising from test piece working or sample setting.

Similarly, the pole density in the crystal orientation of {110}1<001> refers to a range where the crystallite orientation distribution functions (ODF) at the φ2=45° cross section are φ1=85° to 90°, Φ=85° to 90°, and φ2=45°. The pole density in this crystal orientation is calculated in the above-described range shown in FIG. 1.

Here, for the crystal orientation of the rolled sheet, a lattice plane parallel to the sheet surface is normally expressed by (hkl) or {hkl}, and an orientation parallel to the rolling direction is expressed by [uvw] or <uvw>. {hkl} and <uvw> are general terms for equivalent lattice planes and directions, and (uvw) and [hkl] refer to individual lattice planes and directions. That is, in the steel sheet according to the embodiment, the bcc structure is covered, and thus, for example, (110), (−110), (1−10), (−1−10), (101), (−101), (10−1), (−10−1), (011), (0−11), (01−1), and (0−1−1) are equivalent lattice planes and cannot be distinguished. In this case, these lattice planes are collectively referred to as {110}.

<Standard Deviation of Nanohardness at ¼ Position of Sheet Thickness from Surface being 0.8 GPa or Less>

As described above, bending workability is improved by controlling the texture of the surface layer region. However, as a result of studies by the present inventors, it was found that the bias of distortion also results from non-uniformity of hardness in addition to the texture. The non-uniformity of hardness can be caused by the distribution of a transformation structure or a precipitate.

The present inventors found that the non-uniformity of hardness that acts as a cause for inside bend cracks can be evaluated by the standard deviation of nanohardness, and bending workability and stretch flangeability are further improved by setting the standard deviation of nanohardness within a predetermined range. Specifically, it was found that, when the standard deviation of the nanohardness at the ¼ position of the sheet thickness (¼ thickness) from the surface is 0.8 GPa or less, the bending workability and the stretch flangeability are further improved.

When the standard deviation of nanohardness is more than 0.8 GPa, bias of distortion is caused during bending, the effect on the initiation of inside bend cracks being suppressed is weak due to the generation of a shear band, and the stretch flangeability is also not sufficiently improved. Therefore, in the steel sheet according to the present embodiment, the standard deviation of nanohardness is preferably set to 0.8 GPa or less. The standard deviation of nanohardness is more preferably 0.6 GPa or less.

The reason for evaluating the standard deviation of nanohardness at the ¼ thickness position is as follows. In principle, it is considered that the non-uniformity of the hardness in the surface layer region affects the bending workability and the non-uniformity of the hardness in the entire sheet thickness affects the stretch flangeability. Here, in the steel sheet according to the present embodiment, the above-described texture is affected by shear distortion in hot rolling, and different orientations develop in the surface layer region and in the central region. On the other hand, the fractions of microstructures, the density of precipitates, and the like relating to the uniformity of hardness do not significantly different in the surface layer region and the central region. Therefore, the non-uniformity of hardness in the surface layer region or the entire sheet thickness can be represented by evaluating the non-uniformity at the ¼ thickness position.

In the present embodiment, the "standard deviation of nanohardness" is obtained by the following method.

That is, nanohardness is measured at a total of 100 places at intervals of 3 μm on lines perpendicular to the sheet thickness direction and parallel to the rolling direction at the ¼ thickness position using tribo-900 manufactured by Hysitron Inc. under a condition of an indentation depth of 80 nm with a diamond indenter with a Berkovich shape, and the standard deviation is obtained from the histogram of the obtained nanohardness.

2. Chemical Composition

Hereinafter, the chemical composition of the steel sheet according to the present embodiment will be described in detail.

Numerical limitation ranges described below using "to" include values at both ends in the ranges as the lower limit value and the upper limit value. However, numerical values expressed with 'more than' or 'less than' are not included in numerical ranges. "%" relating to the amount of each element indicates "mass %" unless otherwise described.

(C: 0.02% to 0.12%)

C is an effective element for increasing the strength of the steel sheet by forming a carbide containing Ti. When the C content is less than 0.02%, it is not possible to secure the number density of the carbides of $5 \times 10^9$ molecules/mm$^3$ or more. Therefore, the C content is set to 0.02% or more.

On the other hand, when the C content exceeds 0.12%, not only is the effect saturated, but it also becomes difficult for the carbide to melt during slab heating. Therefore, the C content is 0.12% or less. The C content is preferably 0.09% or less.

(Si: 0.01% to 2.00%)

Si is an important element capable of increasing the material strength by solid solution strengthening. When the Si content is less than 0.01%, the strength is low. Therefore, the Si content is set to 0.01% or more. The Si content is preferably 0.10% or more and more preferably 0.30% or more.

On the other hand, when the Si content is more than 2.00%, the surface properties deteriorate. Therefore, the Si content is set to 2.00% or less. The Si content is preferably 1.50% or less.

(Mn: 1.00% to 3.00%)

Mn is an effective element for increasing the strength of the steel sheet by increasing the volume percentage of martensite in the microstructure of the steel sheet. In order to set the volume percentage of tempered martensite to 80% or more, the Mn content is set to 1.00% or more. When the Mn content is less than 1.00%, the volume percentage of tempered martensite decreases, and sufficient strengthening is not possible.

On the other hand, when the Mn content is more than 3.00%, the effect is saturated, and the economic efficiency decreases. Therefore, the Mn content is set to 3.00% or less.

(T: 0.01% to 0.20%)
(Nb: 0% to 0.10%)
(V: 0% to 0.100%)
(0.10≤Ti+Nb+V≤0.45)

Ti, Nb, and V are elements that bond to C or N to form precipitates (carbide, nitride, carbonitride, and the like) and contribute to improvement in steel sheet strength through precipitation hardening by these precipitates. In order to obtain $5 \times 10^9$ pieces/mm$^3$ or more of fine precipitates containing Ti and having an equivalent circle diameter of 5 nm or less through a manufacturing method described below, the Ti content is set to 0.01% or more, and then the total amount of Ti, Nb, and V is set to 0.10% or more. That is, when, by mass %, the Ti content is represented by Ti, the Nb content is represented by Nb, and the V content Is represented by V, 0.10≤Ti+Nb+V is satisfied. The total amount is desirably 0.11% or more and more desirably 0.12% or more.

The reason for setting the upper limit of the Tl content to 0.20%, the upper limit of the Nb content to 0.10%, and the upper limit of the V content to 0.100% is that, when the contents exceed these upper limits, it is difficult to dissolve coarse precipitates precipitated in a casting stage even when the lower limit of the slab heating temperature is set to higher than 1280° C. In addition, when Ti, Nb, and V are excessively contained, slabs or the steel sheet becomes brittle. Therefore, the upper limit for Ti is desirably set to 0.20%, the upper limit for Nb is desirably set to 0.10%, and the upper limit for V is desirably set to 0.100%. When, by mass %, the Ti content is represented by Ti, the Nb content is represented by Nb, and the V content is represented by V, Ti+Nb+V≤0.45 needs to be satisfied, but Ti+Nb+V≤0.40 may be acceptable in consideration of the upper limit of the Ti content, the upper limit of the Nb content, and the upper limit of the V content. Ti+Nb+V may be 0.30 or less, 0.25 or less, or 0.20 or less.

The combination of Ti, Nb, and V for securing $5 \times 10^9$ pieces/mm$^3$ or more of fine precipitation containing Ti and having an equivalent circle diameter of 5 nm or less is not limited, but the Ti content is set to at least 0.01% or more since 1 is easy to be contained in a larger amount in order to dissolve the precipitates during hot-rolled slab heating and is inexpensive. Since neither Nb nor V is necessarily contained, the lower limit is 0%, but the Nb content may be set to 0.01% or more, and the V content may be set to 0.010% or more.

(P: 0.100% or less)

P is an element that is segregated in the sheet thickness center portion of the steel sheet and also an element that embrittles welds. The P content is preferably as low as possible, and, when the P content becomes more than 0.100%, the characteristics significantly deteriorate, and thus the P content is limited to 0.100% or less. A preferable upper limit is 0.050%.

On the other hand, the effect is exhibited without particularly specifying the lower limit (the P content may be 0%), but it is economically disadvantageous to reduce the P content to less than 0.001%, and thus the P content may be set to 0.001% or more.

(S: 0.010% or less)

S is an element that causes embrittlement of slabs by being present as a sulfide. In addition, S is an element that degrades the formability of the steel sheet. Therefore, the S content is limited. When the S content exceeds 0.010%, the characteristics significantly deteriorate, and thus the S content is set to 0.010% or less.

On the other hand, the effect is exhibited without particularly specifying the lower limit (the S content may be 0%), but it is economically disadvantageous to reduce the S content to less than 0.0001%, and thus the S content may be set to 0.0001% or more.

(N: 0.010% or less)

N is an element that forms a coarse nitride and degrades bending workability or stretch flangeability. When the N content exceeds 0.010%, the bending workability or the stretch flangeability significantly deteriorates. Therefore, the N content is set to 0.010% or less. In addition, N bonds to Ti to become coarse TiN, and, in a case where a large amount of N is contained, the number density of the precipitates containing Ti and having an equivalent circle diameter of 5 nm or less is below $5 \times 10^9$ pieces/mm$^3$. Due to these facts, the N content is preferably as small as possible.

On the other hand, the lower limit of the N content does not need to be particularly specified (the N content may be 0%); however, when the N content is reduced to less than 0.0001%, the manufacturing cost significantly increases, and thus the practical lower limit of the N content is 0.0001%. From the viewpoint of the manufacturing cost, the N content may be set to 0.0005% or more.

(Al: 0.005% to 1.000%)

Al is an effective element for microstructure control and deoxidation in hot rolling. In order to obtain these effects, the Al (acid soluble Al) content is set to 0.005% or more. When the Al content is less than 0.005%, a sufficient deoxidation effect cannot be obtained, and a large amount of an inclusion (oxide) is formed in the steel sheet. Such an inclusion acts as a starting point of cracking during bending or stretch flanging and degrades workability.

On the other hand, when the Al content exceeds 1.000%, slabs become brittle, which is not preferable. Therefore, the Al content is set to 1.000% or less.

What has been described above is the basic chemical components that are contained in the steel sheet according to the present embodiment, the chemical composition of the steel sheet according to the present embodiment contains the above-described elements, and the remainder may consist of Fe and impurities. However, for the purpose of improving a variety of characteristics, the steel sheet may further contain elements as follows. The following elements do not need to be necessarily contained, and thus the lower limits of their contents are 0%. The impurities are elements that are incorporated from ore or scraps as a raw material, manufacturing environments, or the like at the time of industrially manufacturing the steel sheet and are allowed to be contained in contents at which the action of the steel sheet according to the present embodiment is not adversely affected.

(Ni: 0% to 2.00%)

(Cu: 0% to 2.00%)

(Cr: 0% to 2.00%)

(Mo: 0% to 2.00%)

Ni, Cu. Cr, and Mo are elements that contribute to the high-strengthening of the steel sheet through microstructure control in hot rolling. In the case of obtaining this effect, the effect becomes significant when one or more of Ni, Cu, Cr, and Mo are contained, and, at this time, the amount of each element is 0.01% or more. Therefore, in the case of obtaining the effect, the amount of each element is preferably set to 0.01% or more.

On the other hand, when the amount of each element exceeds 2.00%, weldability, hot workability, and the like deteriorate. Therefore, in the case of being contained, the upper limit of the amount of each of Ni, Cu, Cr, and Mo is set to 2.00%.

(W: 0% to 0.100%)

W is an element that contributes to improvement in the strength of the steel sheet through precipitation hardening. In the case of obtaining this effect, the W content is preferably set to 0.005% or more.

On the other hand, when the W content exceeds 0.100%, not only is the effect saturated, but the hot workability also deteriorates. Therefore, in a case where W is contained, the W content is set to 0.100% or less.

(B: 0% to 0.0100%)

B is an effective element for controlling transformation in hot rolling and improving the strength of the steel sheet through structure strengthening. In the case of obtaining this effect, the B content is preferably set to 0.0005% or more.

On the other hand, when the B content becomes more than 0.0100%, not only is the effect saturated, but an iron-based boride is also precipitated, which makes an effect of the solid solution of B on hardenability improvement lost. Therefore, even in a case where B is contained, the B content is set to 0.0100% or less. The B content is preferably 0.0080% or less and more preferably 0.0050% or less.

(REM: 0% to 0.0300%)
(Ca: 0% to 0.0300%)
(Mg: 0% to 0.0300%)

REM, Ca. and Mg are elements that contribute to improvement in the strength of the steel sheet. In the case of obtaining this effect, the amounts of REM, Ca. and Mg are each preferably set to 0.0003% or more.

On the other hand, when the amounts of REM. Ca. and Mg each exceed 0.0300%, castability or hot workability deteriorates. Therefore, in a case where REM, Ca, and Mg are contained, the amount of each element is set to 0.0300% or less.

In the present embodiment, REM is an abbreviation for rare earth metal and refers to elements belonging to the lanthanoid series. REM is often added as mischmetal and contains, in addition to Ce, a lanthanoid-series element to form a complex in some cases. Even when the steel sheet according to the present embodiment contains lanthanoid-series elements other than La and Ce as impurities, the effect is exhibited. In addition, even when a metal is added, the effect is exhibited.

The above-described steel composition may be measured by a usual analysis method of steel. For example, the steel composition may be measured using inductively coupled plasma-atomic emission spectrometry (ICP-AES). C and S may be measured using an infrared absorption method after combustion. N may be measured using an inert gas fusion-thermal conductivity method, and O may be measured using an inert gas fusion-nondispersive infrared absorption method.

The steel sheet according to the present embodiment may further have hot-dip galvanizing layer on the surface. In addition, the hot-dip galvanizing layer may be hot-dip galvannealed layer on which an alloying treatment has been performed.

Since galvanizing contributes to improvement in corrosion resistance, in the case of applying the steel sheet to uses where corrosion resistance is expected, it is desirable to perform galvanizing to produce a hot-dip galvanized steel sheet or a galvannealed steel sheet.

Since there is a concern that suspension components of vehicles may be perforated by corrosion, there is a case where it is not possible to thin the steel sheet to a certain sheet thickness or less even after high-strengthening. Since one of the purposes of the high-strengthening of the steel sheet is weight reduction by thinning, even when a high strength steel sheet is developed, if the high strength steel sheet has poor corrosion resistance, regions to which the high strength steel sheet can be applied are limited. As a method for solving this problem, it can be considered to perform plating such as highly corrosion-resistant hot-dip galvanizing on the steel sheet. In the steel sheet according to the present embodiment, the steel sheet components are controlled as described above, and thus hot-dip galvanizing is possible.

The plating may be electrogalvanizing or may be plating containing Si. Al and/or Mg in addition to n.

4. Mechanical Properties

The steel sheet according to the present embodiment has, as a sufficient strength that contributes to the weight reduction of vehicles, a tensile strength (TS) of 980 MPa or more. The tensile strength is preferably 1180 MPa or more. The upper limit of the tensile strength does not need to be particularly specified, and, in the present embodiment, the practical upper limit of the tensile strength may be set to 1370 MPa.

In addition, a target of the steel sheet according to the present embodiment is that the limit bend R/t value, which serves as an index value of inside bend cracks, is 1.5 or less. The R/t value can be obtained by, for example, cutting out a strip-shaped test piece from a ½ position in the width direction of the hot-rolled steel sheet, performing bending according to JIS Z 2248: 2006 (V block 90° bending test) for both a bend where the bending ridge is parallel to the rolling direction (L direction) (L-axis bending) and a bend where the bending ridge is parallel to the direction perpendicular to the rolling direction (C direction) (C-axis bending), and investigating cracks initiated in the inside bend. The minimum bend radii at which cracks are not initiated are obtained, and a value obtained by dividing the average value of the minimum bend radii in the L axis and in the C axis by the sheet thickness is regarded as the limit bend R/t and used as an index value of bending workability.

In addition, another target of the steel sheet according to the present embodiment is that, as an index of having high stretch flangeability, the product of the tensile strength TS (MPa) and the hole expansibility λ (%) is 35000 (MPa·%) or more. The product is preferably 45000 (MPa·%) or more. In the steel sheet according to the present embodiment, furthermore, the total elongation EL is desirably 7.0% or more.

In addition, still another target of the steel sheet according to the present embodiment is that, as an index of having a high proof stress (high yield strength), the ratio (YS/TS) of the yield strength YS to the tensile strength TS is 0.90 or more.

In a tensile test. JIS No. 5 tensile test piece is collected according to JIS Z 2241: 2011 such that a direction perpendicular to the rolling direction is the tensile direction, and the 0.2% proof stress (YS), the tensile strength (TS), and the total elongation (EL) are measured.

In addition, the hole expansibility λ is obtained by performing a hole expanding test according to JIS Z 2256: 2010.

5. Manufacturing Method

Next, a preferable method for manufacturing the steel sheet according to the present embodiment will be described.

In order to control the microstructure, texture, and, preferably, nanohardness distribution in the surface layer region of the steel sheet within the above-described ranges, the hot-rolled steel sheet is preferably manufactured under conditions that a hot rolling step (including a heating step, a rough rolling step, and a finish rolling step), a cooling step, a coiling step, and a heat treatment step are included, a pickling step and a light rolling reduction step are included as necessary between the coiling step and the heat treatment step, and a plating step is included as necessary after the heat treatment step.

Hereinafter, preferable conditions in each step will be described.

A manufacturing step preceding hot rolling is not particularly limited. That is, subsequent to melting with a blast furnace, an electric furnace, or the like, a variety of secondary smelting may be performed, and then casting may be performed by a method such as normal continuous casting or casting by an ingot method. In a case of continuous casting, a cast slab may be cooled to a low temperature, then, heated again and then hot-rolled or a cast slab may be hot-rolled as it is after casting without being cooled to a low temperature. Scrap may be used as a raw material.

<Heating Step>

In the heating step, a slab having the above-described chemical composition that is subjected to the rough rolling step is heated to higher than 1280° C. The reason for setting the heating temperature to higher than 1280° C. is to dissolve elements that contribute to precipitation hardening such as Ti, Nb. and V contained in the slab (in many cases, present as large precipitates of more than 5 nm in the slab) and to precipitate $5 \times 10^9$ pieces/mm³ or more of precipitates containing Ti and having an equivalent circle diameter of 5 nm or less in the subsequent heat treatment step. Since a large amount of Ti, Nb, and V become necessary to secure a predetermined number density of precipitates, it is necessary to heat the slab at a high temperature. When the heating temperature is 1280° C. or lower, Ti. Nb, and V do not sufficiently dissolve.

<Rough Rolling Step>

Next, the heated slab is rough-rolled to produce a rough-rolled sheet.

In the rough rolling step, the thickness of the rough-rolled sheet after the rough rolling is controlled to more than 35 mm and 45 mm or less. The thickness of the rough-rolled sheet affects the degree of the temperature decreased from the tip end to the tail end of the rolled sheet that is caused from the start of rolling to the completion of the rolling in the finish rolling step. In addition, when the thickness of the rough-rolled sheet is 35 mm or less or more than 45 mm, the amount of strain that is introduced into the steel sheet during finish rolling, which is the next step, changes, and the worked structure that is formed during the finish rolling changes. As a result, the recrystallization behavior changes, which makes it difficult to obtain a desired texture. In particular, it becomes difficult to obtain the above-described texture in the steel sheet surface layer region.

It is usual to appropriately set the thickness of the rough-rolled sheet after the rough rolling from the viewpoint of productivity or the like, and it is not usual to set the thickness to control the characteristics of the steel sheet. However, the present inventors have strictly controlled the thickness of the rough-rolled sheet in order to control the texture in the steel sheet surface layer region.

<Finish Rolling Step>

Subsequent to the rough rolling, multi-stand finish rolling is performed. The present inventors found that it is important to control the sheet thickness, the roll shape ratio, the temperature, and the Nb content and the Ti content in steel during rolling in the final two stands of rolling in the finish rolling step for hot rolling, which have usually not been positively controlled, to appropriate ranges derived by a certain calculation equation in terms of controlling the texture.

Therefore, in this multi-stand finish rolling, the finish rolling start temperature is 1000° C. or higher and 1150° C. or lower, and the thickness of the steel sheet (thickness of the rough-rolled sheet) before the start of finish rolling is more than 35 mm and 45 mm or less. In addition, in the rolling one stand before the final stand of the multi-stand finish rolling, the rolling temperature is 960° C. or higher and 1020° C. or lower, and the rolling reduction is larger than 11% and 23% or smaller. In addition, in the final stand of the multi-stand finish rolling, the rolling temperature is 930° C. or higher and 995° C. or lower, and the rolling reduction is larger than 11% and 22% or smaller. In addition, it is preferable that each condition at the time of the final two stands of rolling is controlled and a texture forming parameter CO that is calculated by the following equation 1 satisfies 110 or less. Furthermore, the finish rolling is preferably performed under a condition that the total rolling reduction of the final three stands of the multi-stand finish rolling is 35% or more.

[Equation 1]
$$\omega = 0.3 \left[ \frac{\{1.2 \times 10^4 / F_1^* + 600(Sr_1 - 0.9)\}}{FT_1^*} + \frac{\{800/F_2^* + 400(Sr_2 - 0.9)\}}{FT_2^*} \right] \quad \text{Equation (1)}$$

[Equation 2]
$$PE = \begin{cases} 0.01 & (Ti + 1.3Nb < 0.02) \\ Ti + 1.3Nb - 0.01 & (Ti + 1.3Nb \geq 0.02) \end{cases} \quad \text{Equation (2)}$$

[Equation 3]
$$F_1^* = \begin{cases} 1.0 & (F_1 < 12) \\ F_1 - 11 & (F_1 \geq 12) \end{cases} \quad \text{Equation (3)}$$

[Equation 4]
$$F_2^* = \begin{cases} 0.1 & (F_2 < 11.1) \\ F_2 - 11 & (F_2 \geq 11.1) \end{cases} \quad \text{Equation (4)}$$

[Equation 5]
$$Sr_1 = \frac{\sqrt{\frac{1}{2}D_1 \times (t_1 - t_2)}}{\left(\frac{1}{3}(t_1 + 2t_2)\right)} \quad \text{Equation (5)}$$

[Equation 6]
$$Sr_2 = \frac{\sqrt{\frac{1}{2}D_2 \times (t_2 - t_f)}}{\left(\frac{1}{3}(t_2 + 2t_f)\right)} \quad \text{Equation (6)}$$

[Equation 7]
$$FT_1^* = \frac{(FT_1 - 910)}{10PE} \quad \text{Equation (7)}$$

[Equation 8]
$$FT_2^* = \frac{(FT_2 - 928)}{20PE} \quad \text{Equation (8)}$$

In these equations,

PE: conversion value of recrystallization suppression effect by a precipitate forming element (unit: mass %), Ti: Ti content in the steel (unit: mass %).

Nb: Nb content in the steel (unit: mass %), $F_1^*$: conversion rolling reduction one stand before the final stand (unit: %), $F_2^*$: conversion rolling reduction in the final stand (unit: %), $F_1$: rolling reduction one stand before the final stand (unit: %), $F_2$: rolling reduction in the final stand (unit: %), $Sr_1$: rolled shape ratio one stand before the final stand (no unit), $Sr_2$: rolled shape ratio in the final stand (no unit),
$D_1$: roll diameter one stand before the final stand (unit: mm).
$D_2$: roll diameter in the final stand (unit: mm),
$t_1$: sheet thickness at the start of rolling one stand before the final stand (unit: mm),
$t_2$: sheet thickness at the start of rolling in the final stand (unit: mm),
$t_f^*$: sheet thickness after finish rolling (unit: mm),
$FT_1^*$: conversion rolling temperature one stand before the final stand (unit: ° C.),
$FT_2^*$: conversion rolling temperature in the final stand (unit: ° C.),
$FT_1$: rolling temperature one stand before the final stand (unit: ° C.), and
$FT_2$: rolling temperature in the final stand (unit: ° C.).
are each shown.

However, in Equations 1 to 8, regarding the numbers such as 1 and 2 that are appended to variables as $F_1$ and $F_2$ in the final two stands of rolling in the multi-stand finish rolling, 1 is added to the variable related to rolling one stand before the final stand, and 2 is added to the variable related to rolling in the final stand. For example, in multi-stand finish rolling including seven stands of rolling in total. $F_1$ means the rolling reduction in the sixth stand of rolling counting from the rolling inlet side, and $F_2$ means the rolling reduction in the seventh stand of rolling.

Regarding the conversion value PE of the recrystallization suppression effect by a precipitate forming element, the austenite pinning effect and the solute drug effect become apparent when the value of Ti+1.3 Nb is 0.02 or more. Therefore, in Equation 2, in a case where Ti+1.3Nb<0.02 is satisfied, PE=0.01, and in a case where Ti+1.3Nb≥0.02 is satisfied, PE=Ti+1.3Nb−0.01.

Regarding the conversion rolling reduction $F_1$ one stand before the final stand, the effect of the rolling reduction $F_1$ one stand before the final stand on the texture becomes apparent when the value of $F_1$ is 12 or more. Therefore, in Equation 3, in a case where $F_1$<12 is satisfied, $F_1^*$=1.0, and in a case where $F_1$≤12 is satisfied, $F_1^*$=$F_1$−11.

Regarding the conversion rolling reduction $F_2^*$ in the final stand, the effect of the rolling reduction $F_2$ in the final stand on the texture becomes apparent when the value of $F_2$ is 11.1 or more. Therefore, in Equation 4, in a case where $F_2$<11.1 is satisfied, $F_2^*$=0.1, and in a case where $F_2$≥11.1 is satisfied, $F_2^*$=$F_2$−11.

Equation 1 shows preferable manufacturing conditions in finish rolling in which the rolling temperature $FT_2$ in the final stand is 930'C or higher, and in a case where $FT_2$ is lower than 930° C., the value of the texture forming parameter ω is meaningless. That is, $FT_2$ is 930° C. or higher and ω is 110 or less.

(Finish Rolling Start Temperature being 1000° C. or Higher and 1150° C. or Lower)

When the finish rolling start temperature is lower than 1000° C., the recrystallization of the structure worked by rolling in the previous stands excluding the final two stands does not occur sufficiently, the texture in the steel sheet surface layer region develops, and thus it is not possible to make R/t, which is the average value of the minimum bend radii in the L axis and in the C axis/the sheet thickness, satisfy 1.5 or less.

Therefore, the finish rolling start temperature is preferably set to 1000° C. or higher. The finish rolling start temperature is more preferably 1050° C. or higher. In addition, in a case where the finish rolling start temperature is lower than 1090° C., there is a case where Ti in austenite coarsens and the tensile strength does not sufficiently improve. Therefore, in a case where the tensile strength is set to 1000 MPa or more, the finish rolling start temperature is preferably set to 1090° C. or higher.

On the other hand, when the finish rolling start temperature is set to higher than 1150° C., the austenite grains become excessively coarse, and the toughness deteriorates. Therefore, the finish rolling start temperature is preferably set to 1150° C. or lower.

(Each Condition During Final Two Stands of Rolling in Multi-Stand Finish Rolling being Controlled so that Finish Rolling being Performed Under Condition of Texture Forming Parameter ω Calculated by Equation 1 Becoming 110 or Less)

In the manufacturing of the steel sheet according to the embodiment, the conditions for the final two stands of hot rolling in the multi-stand finish rolling are important.

The rolling reductions $F_1$ and $F_2$ at the time of the final two stands of rolling used to calculate ω defined by Equation 1 are numerical values expressing a difference in sheet thickness before and after rolling at each stand divided by the sheet thickness before rolling as a percentage, the diameters $D_1$ and $D_2$ of the rolling rolls are measured at room temperature, and it is not necessary to consider the flattening during hot rolling. In addition, the sheet thicknesses $t_1$ and $t_2$ on the rolling inlet side, and the sheet thickness $t_f$ after finish rolling may be measured on the spot using radiation or the like or may be obtained by calculation from a rolling force in consideration of deformation resistance and the like. The sheet thickness $t_f$ after finish rolling may be the final sheet thickness of the steel sheet after the completion of hot rolling. Regarding the rolling start temperatures $FT_1$ and $FT_2$, the values measured by a thermometer such as a radiation-type thermometer between the finish rolling stands may be used.

The texture forming parameter ω is an index in consideration of the rolling strain introduced into the entire steel sheet in the final two stands of finish rolling, the shear strain introduced into the surface layer region of the steel sheet, and the recrystallization rate after rolling, and means the ease of forming a texture. When the final two stands of finish rolling are performed under a condition that the texture forming parameter co exceeds 110, it is not possible to make the sum of the average pole density of the crystal orientation group consisting of {211}<11> to {111}<112> and the pole density in the crystal orientation {110}<001> become 6.0 or less in the surface layer region. Therefore, the texture forming parameter ω is preferably controlled to 110 or less. The texture forming parameter ω is more preferably 98 or less.

(Rolling Temperature $FT_1$ One Stand Before Final Stand being 960° C. or Higher and 1020° C. or Lower)

When the rolling temperature $FT_1$ one stand before the final stand is lower than 960° C., the recrystallization of the structure worked by rolling does not sufficiently occur and the texture in the surface layer region cannot be controlled within the above-described range. Therefore, the rolling temperature $FT_1$ is set to 960° C. or higher. On the other hand, when the rolling temperature $FT_1$ is higher than 1020° C., the formation state or recrystallization behavior of the worked structure changes due to the coarsening of the austenite grains or the like, and thus the texture in the surface layer region cannot be controlled within the above-described range. Therefore, the rolling temperature $FT_1$ is set to 1020° C. or lower.

(Rolling Reduction $F_1$ One Stand Before Final Stand being More than 11% and 23% or Less)

When the rolling reduction $F_1$ one stand before the final stand is 11% or less, the amount of strain introduced into the steel sheet by rolling becomes insufficient, recrystallization does not occur sufficiently, and the texture in the surface layer region cannot be controlled within the above-described range. Therefore, the rolling reduction $F_1$ is set to more than 11%. On the other hand, when the rolling reduction $F_1$ is more than 23%, in the central part of the steel sheet, although there is a case where recrystallization is promoted, in the surface layer region, lattice defects in the crystal become excessive due to excessive shear distortion, and the recrystallization behavior changes, and thus the texture in the surface layer region cannot be controlled within the above-described range. Therefore, the rolling reduction $F_1$ is set to 23% or less.

The rolling reduction $F_1$ (%) is calculated as follows.

$$F_1 = (t_1 - t_2)/t_1 \times 100$$

(Rolling Temperature $FT_2$ in Final Stand being 930° C. or Higher and 995° C. or Lower)

When the rolling temperature $FT_2$ in the final stand is set to lower than 930° C., the recrystallization rate of austenite significantly decreases, which makes it impossible to make the sum of the average pole density of the crystal orientation group consisting of {211}<111> to {111}<112> and the pole density in the crystal orientation {110}<001> become 6.0 or less in the surface layer region. Therefore, the rolling temperature $FT_2$ is set to 930° C. or higher. On the other hand, when the rolling temperature $FT_2$ is higher than 995° C., the formation state or recrystallization behavior of the worked structure changes, and thus the texture in the surface layer region cannot be controlled within the above-described range. Therefore, the rolling temperature $FT_2$ is set to 995° C. or lower.

(Rolling Reduction $F_2$ of Final Stand being More than 11% and 22% or Less)

When the rolling reduction $F_2$ of the final stand is 11% or less, the amount of strain introduced into the steel sheet by rolling is insufficient, recrystallization does not occur sufficiently, and thus the texture in the surface layer region cannot be controlled within the above-described range. Therefore, the rolling reduction $F_2$ is set to more than 11%. On the other hand, when the rolling reduction $F_2$ is more than 22%, the lattice defects in the crystals become excessive, and the recrystallization behavior changes, and thus the texture in the surface layer region cannot be controlled within the above-described range. Therefore, the rolling reduction $F_2$ is set to 22% or less. The rolling reduction $F_2$ is calculated as follows.

$$F_2 = (t_2 - t_f)/t_2 \times 100)$$

(Total Rolling Reduction $F_t$ of Final Three Stands being 35% or More)

The total rolling reduction $F_t$ of the final three stands is preferably as large as possible in order to promote the recrystallization of austenite. When the total rolling reduction $F_t$ of the final three stands is less than 35%, the recrystallization rate of austenite significantly decreases, which makes it impossible to make the sum of the average pole density of the crystal orientation group consisting of {211}<111> to {111}<112> and the pole density in the crystal orientation {110}<001> become 6.0 or less in the surface layer region.

The total rolling reduction $F_t$ of the final three stands is calculated by the following equation.

$$F_t = (t_0 - t_f)/t_0 \times 100$$

Here, $t_0$ is the sheet thickness at the start of rolling two stands before the final stand (unit: mm).

In the finish rolling step, each of the above-described conditions is controlled in a simultaneous and inseparable manner. Regarding each of the above-described conditions, it is not enough to satisfy any one condition alone, and the texture in the surface layer region can be controlled within the above-described range by satisfying each of the above-described conditions at the same time.

Subsequent to the finish rolling, the cooling step and the coiling step are performed. Controlling the cooling rate after the finish rolling and, furthermore, performing a heat treatment under controlled conditions contribute to the control of the uniformity of hardness.

<Cooling Step>

(Cooling from 800° C. to 450° C. at average cooling rate of 80° C./sec or faster)

(Cooling from 450°C to coiling temperature at average cooling rate of 60° C./sec or faster)

In the cooling step, the hot-rolled steel sheet after the finish rolling is cooled in a manner that the average cooling rate from 800° C. to 450° C. is 80° C./sec or faster. In a usually hot rolling facility, since a steel sheet reaches cooling zone within several seconds after the completion of the finish rolling, the realistic retention time at 800° C. or higher is shorter than 5 seconds from the completion of the finish rolling. When the average cooling rate is slower than 80° C./sec, precipitation occurs during a cooling process, which acts as a cause for non-uniformity of the hardness of the final structure.

When the cooling rate is slow even at a temperature of 450° C. or lower, the degree of self-tempering (recovery of dislocations during cooling) differs between a part transformed in the initial stage and a part transformed in the later stage, and the dislocation density becomes nonuniform. When the dislocation density becomes nonuniform, the non-uniformity acts as a cause for non-uniformity of the hardness of the final structure.

Due to these facts, in a case where the standard deviation of nanohardness at the ¼ thickness position is set to 0.8 GPa or less, it is preferable to cool the steel sheet from 800° C. to 450° C. at an average cooling rate of 80° C./sec or faster and cool the steel sheet from 450° C. to the coiling temperature at an average cooling rate of 60° C./sec or faster.

<Coiling Step>

(Coiling Temperature: 300° C. or Lower)

In order to obtain 80% or more of tempered martensite in the final structure, it is necessary to obtain 80% or more of tempered martensite and fresh martensite in total before a heat treatment. In order to obtain 80% or more of tempered martensite and fresh martensite before the heat treatment, it is necessary to set the coiling temperature to 300° C. or lower. When the coiling temperature is higher than 300° C., tempered martensite in the final structure becomes less than 80%.

<Pickling Step>

The hot-rolled steel sheet after the coiling step may be pickled. Pickling makes it possible to improve the plating property in the subsequent manufacturing steps or enhance the chemical convertibility in vehicle manufacturing steps.

In addition, when a scale-attached hot-rolled steel sheet is softly reduced, the scale exfoliates and is pressed in, which generates a defect in some cases. Therefore, before light rolling reduction to be described below is performed, first, pickling is performed on the hot-rolled steel sheet. Pickling conditions are not particularly limited, but it is usual to perform pickling with hydrochloric acid, sulfuric acid, or the like containing an inhibitor.

<Light Rolling Reduction Step>

In the case of obtaining a tensile strength of 980 MPa or more, the light rolling reduction step is not essential; however, in a case where precipitates containing Ti and having an equivalent circle diameter of 5 nm or less are set to $5 \times 10^{11}$ pieces/mm$^1$ or more and the tensile strength is set to 1180 MPa or more, it is preferable to apply rolling to the hot-rolled steel sheet after the pickling step at a rolling reduction of 1% to 30%.

The application of reduction to the hot-rolled steel sheet makes it possible to further introduce precipitation sites for precipitating precipitates in the heat treatment in the subsequent step. The introduction of the precipitation sites makes it possible to make the precipitates containing Ti and having an equivalent circle diameter of 5 nm or less become $5 \times 10^{11}$ pieces/mm$^3$ or more and obtain a tensile strength of 1180 MPa or more by the heat treatment.

On the other hand, when the rolling reduction exceeds 30%, not only is the effect saturated, but the recovery of introduced dislocations also becomes insufficient, and the elongation also significantly deteriorates. Due to these facts, in the case of performing the reduction, the rolling reduction is preferably set to 30% or less. As long as it is possible to introduce dislocations that become the nucleation sites of precipitates, as the reduction, reduction of 30% or less may be performed in one pass or reduction may be performed a plurality of divided times such that the cumulative rolling reduction becomes 30% or less.

<Heat Treatment Step>

(Retaining in Temperature Range of 450° C. to 700° C. for 10 to 1500 Seconds)

A heat treatment is performed by reheating the hot-rolled steel sheet after the light rolling reduction step to a temperature range of 450° C. to 700° C. and retaining the hot-rolled steel sheet in this temperature range for 10 to 1500 seconds. When the hot-rolled steel sheet is reheated and thereby heat-treated after the coiling step or after the light rolling reduction step in a case where light rolling reduction has been performed, it is possible to precipitate the precipitates containing Ti and having an equivalent circle diameter of 5 nm or less. The above-described heat treatment makes it possible to precipitate $5 \times 10^9$ pieces/mm$^3$ or more of precipitates even in a case where light rolling reduction is not performed and makes it possible to precipitate $5 \times 10^{11}$ pieces/mm$^3$ or more of precipitates in a case where the light rolling reduction has been performed.

When the heat treatment temperature (reheating temperature) is lower than 450° C., the diffusion of atoms is insufficient, and it is not possible to obtain a sufficient amount of precipitates. When the heat treatment for a short time is taken into account, the heat treatment temperature is desirably 500° C. or higher. When the heat treatment temperature is higher than 700° C., the precipitates become coarse, and it becomes impossible to precipitate $5 \times 10^9$ pieces/mm$^3$ or more of precipitates. In this case, it is difficult to secure a tensile strength of 980 MPa or more. When the retention time in the heat treatment step is shorter than 10 seconds, the diffusion of atoms is insufficient, and it is not possible to precipitate $5 \times 10^9$ pieces/mm$^3$ or more of the precipitates containing 11 and having an equivalent circle diameter of 5 nm or less. When the retention time is longer than 1500 seconds, the precipitates become coarse, and the precipitates containing Ti and having an equivalent circle diameter of 5 nm or less become less than $5 \times 10^9$ pieces/mm$^3$. Due to these facts, the retention time needs to be set to 10 and 1500 seconds. In the case of sufficiently precipitating the precipitates containing Ti and having an equivalent circle diameter of 5 nm or less, it is preferable to set a constant heat treatment time depending on the heat treatment temperature, and it is desirable that a precipitation parameter P (° C.·s), which indicates the degree of precipitation, satisfies a range of P≥10000.

Here, P is expressed by the following equation.

$$P=(273+t)\cdot(\log_{10}(t)+10)$$

Furthermore, in the equation, T represents the heat treatment temperature (° C.), and t represents the heat treatment time (seconds).

The heat treatment at a temperature of 450° C. to 700° C. also includes heating or slow cooling in this temperature range. That is, the retention time means the time during which the steel sheet is within the temperature range of 450 to 700° C. after reheating, and, as long as the steel sheet stays in this temperature range for a predetermined time, the temperature may change in the middle.

(Average Temperature Rising Rate in Temperature Range of 200° C. to 450° C.: 3° C./Sec or Faster)

A temperature range from 200° C. to 450° C. is a temperature range in which the precipitation of precipitates does not occur and only the recovery of dislocations occurs. In the present embodiment, dislocations are uniformly dispersed by controlling the cooling after the hot rolling; however, when the retention time in this temperature range becomes long, dislocations are recovered in some grains, which leads to non-uniformity of the hardness of the final structure. Therefore, in a case where the standard deviation of nanohardness at the ¼ thickness position is set to 0.8 GPa or less, when the steel sheet is reheated to the temperature range of 450° C. to 750° C., the average temperature rising rate from 200° C. to 450° C. is preferably set to 3° C./sec or faster. In a temperature range of 200'C or lower, since the recovery of dislocations rarely occurs, the temperature rising rate is not specified. Since higher than 450° C. is a temperature range in which the precipitation of precipitates begins, as long as the total time at 450° C. to 700° C. is within a range of 10 to 1500 seconds, the temperature rising rate at 450° C. or higher is not specified.

<Plating Step>

The steel sheet according to the present embodiment can be obtained by a manufacturing method including the above-described steps. However, in a case where the steel sheet according to the present embodiment is made into a hot-dip galvanized steel sheet or hot-dip galvannealed steel sheet for the purpose of improving the corrosion resistance, it is preferable to perform hot-dip galvanizing on the hot-rolled steel sheet after the heat treatment step. Since galvanizing contributes to improvement in corrosion resistance, in the case of applying the steel sheet to uses where corrosion resistance is expected, it is desirable to perform galvanizing. The galvanizing is preferably hot-dip galvanizing. The conditions of the hot-dip galvanizing are not particularly limited, and the hot-dip galvanizing may be performed under well-known conditions.

In addition, a galvannealed steel sheet can be manufactured by heating the hot-rolled steel sheet after the hot-dip galvanizing (hot-dip galvanized steel sheet) to 460° C. to 600° C. to alloy the plating. The galvannealed steel sheet is capable of imparting an effect such as improvement in spot weldability or improvement in sliding ability during reduction in area forming in addition to improvement in the corrosion resistance, and thus the alloying may be performed depending on uses.

The above-described hot-dip galvanizing and hot-dip galvannealing may be performed after the steel sheet is once cooled to room temperature after the heat treatment at 450° C. to 700° C. or may be performed continuously after the steel sheet is retained in the temperature range of 450° C. to 700° C. In either case, the total retention time at 450° C. to 700° C. may not exceed 1500 seconds.

Other than the galvanizing, even when Al plating, plating containing Mg or electroplating is performed, the steel sheet to the present embodiment can be manufactured.

EXAMPLES

Hereinafter, the hot-rolled steel sheet according to the present invention will be described more specifically with reference to examples. Here, the following examples are examples of the hot-rolled steel sheet of the present invention, and the hot-rolled steel sheet of the present invention is not limited to the following aspects. Conditions in examples to be described below are exemplary conditions adopted to confirm the feasibility and effects of the present invention, and the present invention is not limited to these exemplary conditions. The present invention is capable of adopting a variety of conditions within the scope of the gist of the present invention as long as the object of the present invention is achieved.

Steels having a chemical composition shown in Table 1 were cast, after the casting, as they were or reheated after once cooled to room temperature, and heated to a temperature range shown in Table 2. After that, slabs were rough-rolled at temperatures of 1100° C. or higher to the sheet thicknesses of the rough-rolled sheets shown in Table 2, thereby manufacturing rough-rolled sheets.

The rough-rolled sheets were subjected to multi-stand finish rolling including seven stands in total. In the multi-stand finish rolling step, finish rolling was started from the rolling start temperatures shown in Table 2, and the rough-rolled sheets were rolled to sheet thicknesses to in the rolling of the fifth stand shown in Table 3 by a total of four stands of rolling excluding the final three stands of rolling from the start of the rolling.

After that, hot rolling was performed under each condition shown in Table 3 and Table 4, and then cooling and coiling were performed under each condition shown in Table 5. The final sheet thicknesses of the steel sheets after the completion of the hot rolling were regarded as the sheet thicknesses $t_f$ after the finish rolling (values in Table 2).

After the hot-rolled steel sheets obtained as described above were pickled, light rolling reduction was performed on some of the hot-rolled steel sheets under the conditions shown in Table 6, and heat treatments were performed under the conditions shown in Table 6.

Furthermore, after that, hot-dip galvanizing (GI) or hot-dip galvannealing (GA) was performed on some of the hot-rolled steel sheets as shown in Table 7.

TABLE 1

| Steel type | Chemical composition (unit: mass %, remainder being Fe and impurities) | | | | | | | | | | | |
|---|---|---|---|---|---|---|---|---|---|---|---|---|
| | C | Si | Mn | Al | Ti | Nb | V | P | S | N | Ti + Nb + V | Others |
| A | 0.07 | 0.40 | 2.20 | 0.050 | 0.12 | 0.02 | <0.001 | 0.010 | 0.001 | 0.003 | 0.14 | B: 0.0020 |
| B | 0.09 | 0.40 | 2.40 | 0.020 | 0.16 | 0.02 | <0.001 | 0.010 | 0.001 | 0.002 | 0.18 | B: 0.0020 |
| C | 0.07 | 0.08 | 2.10 | 0.100 | 0.10 | 0.03 | 0.060 | 0.008 | 0.001 | 0.003 | 0.19 | |
| D | 0.10 | 1.90 | 2.60 | 0.025 | 0.11 | 0.02 | <0.001 | 0.010 | 0.002 | 0.002 | 0.13 | |
| E | 0.06 | 1.00 | 0.80 | 0.029 | 0.10 | 0.01 | <0.001 | 0.010 | 0.001 | 0.003 | 0.11 | |
| F | 0.07 | 1.30 | 2.50 | 0.025 | <0.001 | 0.01 | <0.001 | 0.011 | 0.001 | 0.002 | 0.01 | |
| G | 0.06 | 1.60 | 2.30 | 0.041 | 0.05 | 0.03 | <0.001 | 0.009 | 0.002 | 0.002 | 0.08 | |
| H | 0.06 | 1.00 | 1.50 | 0.033 | 0.16 | <0.001 | <0.001 | 0.010 | 0.001 | 0.003 | 0.16 | |
| I | 0.08 | 1.89 | 2.21 | 0.025 | 0.09 | 0.01 | <0.001 | 0.010 | 0.001 | 0.003 | 0.10 | Cr: 0.40 |
| J | 0.12 | 1.30 | 1.80 | 0.020 | 0.09 | 0.04 | <0.001 | 0.012 | 0.001 | 0.003 | 0.13 | Mo: 0.20 |
| K | 0.06 | 1.02 | 2.01 | 0.030 | 0.10 | 0.02 | <0.001 | 0.010 | 0.001 | 0.003 | 0.12 | |
| L | 0.06 | 0.90 | 1.88 | 0.029 | 0.11 | 0.01 | <0.001 | 0.010 | 0.001 | 0.003 | 0.12 | W: 0.010 |
| M | 0.08 | 0.87 | 1.30 | 0.030 | 0.08 | 0.02 | <0.001 | 0.011 | 0.002 | 0.003 | 0.10 | REM: 0.0010 |
| N | 0.08 | 0.40 | 2.00 | 0.030 | 0.10 | 0.02 | <0.001 | 0.011 | 0.002 | 0.003 | 0.12 | Ni: 0.20 |
| O | 0.08 | 0.20 | 2.20 | 0.030 | 0.11 | 0.02 | <0.001 | 0.009 | 0.002 | 0.003 | 0.13 | Cu: 0.20 |
| P | 0.08 | 0.60 | 2.30 | 0.030 | 0.10 | 0.02 | <0.001 | 0.009 | 0.002 | 0.003 | 0.12 | Ca: 0.01 |
| Q | 0.08 | 0.40 | 2.40 | 0.030 | 0.11 | 0.02 | <0.001 | 0.011 | 0.002 | 0.003 | 0.13 | Mg: 0.01 |
| R | 0.04 | 0.40 | 2.40 | 0.300 | 0.11 | 0.02 | <0.001 | 0.011 | 0.002 | 0.003 | 0.13 | |

TABLE 2

| | | | | Hot rolling | |
|---|---|---|---|---|---|
| No. | Steel type | Sheet thickness ($t_f$) (mm) | Sheet thickness of rough-rolled sheet (mm) | Slab heating temperature (° C.) | Finish rolling start temperature (° C.) |
| 1 | A | 2.5 | 40 | 1290 | 1100 |
| 2 | B | 2.3 | 40 | 1290 | 1090 |
| 3 | C | 2.5 | 40 | 1320 | 1090 |
| 4 | D | 2.5 | 40 | 1290 | 1110 |
| 5 | E | 2.3 | 40 | 1290 | 1100 |
| 6 | F | 2.3 | 40 | 1290 | 1090 |
| 7 | G | 2.3 | 40 | 1290 | 1090 |
| 8 | H | 2.3 | 40 | 1300 | 1110 |
| 9 | I | 2.3 | 40 | 1290 | 1150 |
| 10 | J | 2.3 | 40 | 1290 | 1090 |
| 11 | K | 2.3 | 40 | 1290 | 1090 |
| 12 | L | 2.3 | 40 | 1290 | 1090 |
| 13 | M | 2.3 | 40 | 1290 | 1090 |
| 14 | A | 2.3 | 40 | 1290 | 1090 |

TABLE 2-continued

| No. | Steel type | Sheet thickness ($t_f$) (mm) | Sheet thickness of rough-rolled sheet (mm) | Slab heating temperature (°C.) | Finish rolling start temperature (°C.) |
|---|---|---|---|---|---|
| 15 | A | 2.3 | 40 | 1290 | 1090 |
| 16 | A | 2.9 | 40 | 1290 | 1090 |
| 17 | A | 4.0 | 40 | 1290 | 1090 |
| 18 | A | 2.2 | 40 | 1290 | 1090 |
| 19 | A | 2.9 | 40 | 1250 | 1090 |
| 20 | A | 3.3 | 40 | 1290 | 990 |
| 21 | A | 3.3 | 40 | 1290 | 1090 |
| 22 | A | 2.9 | 40 | 1290 | 1090 |
| 23 | A | 2.9 | 40 | 1290 | 1120 |
| 24 | A | 2.6 | 40 | 1290 | 1090 |
| 25 | A | 2.6 | 40 | 1290 | 1090 |
| 26 | A | 2.8 | 40 | 1290 | 1090 |
| 27 | B | 2.3 | 40 | 1290 | 1090 |
| 28 | B | 4.0 | 40 | 1290 | 1100 |
| 29 | B | 2.0 | 40 | 1290 | 1090 |
| 30 | B | 4.0 | 40 | 1320 | 1090 |
| 31 | B | 2.9 | 40 | 1290 | 1090 |
| 32 | B | 2.9 | 40 | 1290 | 1090 |
| 33 | B | 4.5 | 40 | 1290 | 1090 |
| 34 | N | 2.3 | 40 | 1290 | 1090 |
| 35 | O | 2.3 | 40 | 1290 | 1090 |
| 36 | P | 2.3 | 40 | 1290 | 1090 |
| 37 | Q | 2.3 | 40 | 1290 | 1100 |
| 38 | Q | 2.3 | 40 | 1290 | 1090 |
| 39 | A | 2.3 | 40 | 1290 | 1090 |
| 40 | A | 2.3 | 40 | 1290 | 1090 |
| 41 | A | 2.3 | 40 | 1290 | 1090 |
| 42 | A | 2.3 | 40 | 1290 | 1090 |
| 43 | K | 2.3 | 37 | 1290 | 1090 |
| 44 | K | 2.3 | 45 | 1290 | 1090 |
| 45 | A | 2.9 | 34 | 1290 | 1090 |
| 46 | B | 2.3 | 40 | 1290 | 1090 |
| 47 | A | 2.5 | 40 | 1290 | 1100 |
| 48 | R | 2.5 | 40 | 1290 | 1100 |

TABLE 3

| No. | Ti (mass %) | Nb (mass %) | PE (Ti + 1.3Nb − 0.01) (mass %) | $FT_1$ (°C.) | $FT_2$ (°C.) | $t_0$ (mm) | $t_1$ (mm) |
|---|---|---|---|---|---|---|---|
| 1 | 0.12 | 0.02 | 0.13 | 983 | 969 | 4.9 | 3.80 |
| 2 | 0.16 | 0.02 | 0.18 | 998 | 982 | 4.8 | 3.70 |
| 3 | 0.10 | 0.03 | 0.13 | 989 | 966 | 4.8 | 3.80 |
| 4 | 0.11 | 0.02 | 0.13 | 995 | 964 | 5.0 | 3.80 |
| 5 | 0.10 | 0.01 | 0.10 | 984 | 974 | 4.8 | 3.76 |
| 6 | <0.001 | 0.01 | 0.00 | 993 | 966 | 4.9 | 3.75 |
| 7 | 0.05 | 0.03 | 0.08 | 991 | 965 | 4.7 | 3.75 |
| 8 | 0.16 | <0.001 | 0.15 | 989 | 969 | 4.8 | 3.70 |
| 9 | 0.09 | 0.01 | 0.09 | 988 | 965 | 5.0 | 3.68 |
| 10 | 0.09 | 0.04 | 0.13 | 996 | 969 | 5.0 | 3.70 |
| 11 | 0.10 | 0.02 | 0.12 | 990 | 968 | 4.8 | 3.69 |
| 12 | 0.11 | 0.01 | 0.11 | 985 | 970 | 4.8 | 3.68 |
| 13 | 0.08 | 0.02 | 0.10 | 987 | 961 | 4.7 | 3.67 |
| 14 | 0.12 | 0.02 | 0.13 | 985 | 971 | 4.9 | 3.67 |
| 15 | 0.12 | 0.02 | 0.13 | 982 | 970 | 3.7 | 3.12 |
| 16 | 0.12 | 0.02 | 0.13 | 984 | 965 | 4.9 | 4.44 |
| 17 | 0.12 | 0.02 | 0.13 | 985 | 969 | 6.5 | 5.92 |
| 18 | 0.12 | 0.02 | 0.13 | 966 | 986 | 4.5 | 3.15 |
| 19 | 0.12 | 0.02 | 0.13 | 995 | 962 | 4.6 | 4.55 |
| 20 | 0.12 | 0.02 | 0.13 | 968 | 964 | 5.7 | 5.02 |
| 21 | 0.12 | 0.02 | 0.13 | 969 | 954 | 5.5 | 4.70 |
| 22 | 0.12 | 0.02 | 0.13 | 999 | 991 | 5.0 | 4.09 |
| 23 | 0.12 | 0.02 | 0.13 | 963 | 953 | 4.7 | 4.37 |
| 24 | 0.12 | 0.02 | 0.13 | 986 | 972 | 4.9 | 3.87 |
| 25 | 0.12 | 0.02 | 0.13 | 986 | 972 | 4.9 | 3.88 |
| 26 | 0.12 | 0.02 | 0.13 | 986 | 946 | 4.9 | 4.11 |
| 27 | 0.16 | 0.02 | 0.18 | 953 | 947 | 3.7 | 3.20 |
| 28 | 0.16 | 0.02 | 0.18 | 947 | 943 | 6.8 | 6.06 |
| 29 | 0.16 | 0.02 | 0.18 | 988 | 970 | 5.5 | 3.30 |
| 30 | 0.16 | 0.02 | 0.18 | 985 | 970 | 6.5 | 5.92 |
| 31 | 0.16 | 0.02 | 0.18 | 1010 | 993 | 4.8 | 4.03 |
| 32 | 0.16 | 0.02 | 0.18 | 1005 | 978 | 4.8 | 4.03 |
| 33 | 0.16 | 0.02 | 0.18 | 1028 | 978 | 6.8 | 6.00 |
| 34 | 0.10 | 0.02 | 0.12 | 988 | 975 | 5.0 | 3.67 |
| 35 | 0.11 | 0.02 | 0.13 | 980 | 973 | 5.1 | 3.59 |
| 36 | 0.10 | 0.02 | 0.12 | 985 | 976 | 5.0 | 3.57 |
| 37 | 0.11 | 0.02 | 0.13 | 995 | 975 | 5.0 | 3.59 |
| 38 | 0.11 | 0.02 | 0.13 | 993 | 976 | 5.0 | 3.63 |
| 39 | 0.12 | 0.02 | 0.13 | 1025 | 970 | 4.8 | 3.67 |
| 40 | 0.12 | 0.02 | 0.13 | 1013 | 1000 | 4.9 | 3.65 |
| 41 | 0.12 | 0.02 | 0.13 | 999 | 977 | 4.9 | 3.77 |
| 42 | 0.12 | 0.02 | 0.13 | 997 | 971 | 4.9 | 3.77 |
| 43 | 0.10 | 0.02 | 0.12 | 991 | 967 | 4.7 | 3.68 |
| 44 | 0.10 | 0.02 | 0.12 | 989 | 969 | 4.7 | 3.69 |
| 45 | 0.12 | 0.02 | 0.13 | 980 | 960 | 4.9 | 4.43 |
| 46 | 0.16 | 0.02 | 0.18 | 997 | 980 | 4.9 | 3.70 |
| 47 | 0.12 | 0.02 | 0.13 | 983 | 969 | 4.9 | 3.80 |
| 48 | 0.11 | 0.02 | 0.12 | 985 | 973 | 4.9 | 3.79 |

TABLE 4

| No. | $D_1$ (mm) | $Sr_1$ | $t_2$ (mm) | $D_2$ (mm) | $Sr_2$ | $F_1$ (%) | $F_2$ (%) | $F_t$ (%) |
|---|---|---|---|---|---|---|---|---|
| 1 | 720 | 5.20 | 3.00 | 805 | 5.32 | 21.1 | 16.7 | 49 |
| 2 | 720 | 5.36 | 2.90 | 805 | 6.22 | 21.6 | 20.7 | 52 |
| 3 | 720 | 5.41 | 2.95 | 805 | 5.08 | 22.4 | 15.3 | 48 |
| 4 | 720 | 5.28 | 2.98 | 805 | 5.23 | 21.6 | 16.1 | 50 |
| 5 | 720 | 4.95 | 3.03 | 805 | 6.74 | 19.4 | 24.1 | 53 |
| 6 | 720 | 5.14 | 2.98 | 805 | 6.55 | 20.5 | 22.8 | 53 |
| 7 | 720 | 5.54 | 2.89 | 805 | 6.17 | 22.9 | 20.4 | 51 |
| 8 | 720 | 5.58 | 2.85 | 805 | 5.99 | 23.0 | 19.3 | 52 |
| 9 | 720 | 5.48 | 2.86 | 805 | 6.04 | 22.3 | 19.6 | 54 |
| 10 | 720 | 5.45 | 2.88 | 805 | 6.13 | 22.2 | 20.1 | 54 |
| 11 | 720 | 5.33 | 2.90 | 805 | 6.22 | 21.4 | 20.7 | 52 |
| 12 | 720 | 5.57 | 2.84 | 805 | 5.94 | 22.8 | 19.0 | 52 |
| 13 | 720 | 5.37 | 2.88 | 805 | 6.13 | 21.5 | 20.1 | 51 |
| 14 | 720 | 5.37 | 2.88 | 805 | 6.13 | 21.5 | 20.1 | 53 |
| 15 | 720 | 4.51 | 2.67 | 805 | 5.04 | 14.4 | 13.9 | 39 |
| 16 | 720 | 4.96 | 3.46 | 805 | 4.87 | 22.0 | 16.2 | 40 |
| 17 | 720 | 4.04 | 4.73 | 805 | 4.04 | 20.1 | 15.4 | 38 |
| 18 | 760 | 5.43 | 2.56 | 760 | 5.04 | 18.7 | 14.1 | 51 |
| 19 | 760 | 4.99 | 3.56 | 760 | 5.07 | 21.8 | 18.5 | 38 |
| 20 | 760 | 4.21 | 4.11 | 760 | 4.92 | 18.1 | 19.7 | 42 |
| 21 | 760 | 4.31 | 3.86 | 760 | 4.19 | 17.9 | 14.5 | 40 |
| 22 | 760 | 4.20 | 3.47 | 760 | 4.75 | 15.3 | 16.3 | 42 |
| 23 | 760 | 4.81 | 3.50 | 760 | 4.87 | 20.0 | 17.1 | 38 |
| 24 | 720 | 5.38 | 3.00 | 805 | 4.64 | 22.5 | 13.3 | 47 |
| 25 | 720 | 5.40 | 3.00 | 805 | 4.64 | 22.7 | 13.3 | 47 |
| 26 | 720 | 3.55 | 3.61 | 805 | 5.69 | 12.2 | 21.3 | 42 |
| 27 | 732 | 4.16 | 2.80 | 805 | 5.74 | 12.7 | 17.8 | 38 |
| 28 | 720 | 4.07 | 4.80 | 805 | 4.22 | 20.7 | 16.7 | 41 |
| 29 | 720 | 5.87 | 2.55 | 805 | 6.81 | 22.7 | 21.6 | 64 |
| 30 | 720 | 4.04 | 4.73 | 805 | 4.04 | 20.1 | 15.4 | 38 |
| 31 | 720 | 3.80 | 3.49 | 805 | 4.97 | 13.4 | 16.9 | 40 |
| 32 | 720 | 3.80 | 3.49 | 805 | 4.97 | 13.4 | 16.9 | 40 |
| 33 | 720 | 3.10 | 5.20 | 805 | 3.55 | 13.3 | 13.5 | 34 |
| 34 | 720 | 5.59 | 2.83 | 805 | 5.90 | 22.9 | 18.7 | 54 |
| 35 | 720 | 5.65 | 2.77 | 805 | 5.60 | 22.8 | 17.0 | 55 |
| 36 | 720 | 5.49 | 2.79 | 805 | 5.70 | 21.8 | 17.6 | 54 |
| 37 | 720 | 5.46 | 2.81 | 805 | 5.80 | 21.7 | 18.1 | 54 |
| 38 | 720 | 5.57 | 2.81 | 805 | 5.80 | 22.6 | 18.1 | 54 |
| 39 | 720 | 5.37 | 2.88 | 805 | 6.13 | 21.5 | 20.1 | 52 |

TABLE 4-continued

| | | | Hot rolling | | | | | |
|---|---|---|---|---|---|---|---|---|
| No. | $D_1$ (mm) | $Sr_1$ | $t_2$ (mm) | $D_2$ (mm) | $Sr_2$ | $F_1$ (%) | $F_2$ (%) | $F_t$ (%) |
| 40 | 720 | 5.35 | 2.87 | 805 | 6.08 | 21.4 | 19.9 | 53 |
| 41 | 720 | 5.68 | 2.87 | 805 | 6.08 | 23.9 | 19.9 | 53 |
| 42 | 720 | 5.07 | 3.01 | 805 | 6.66 | 20.2 | 23.6 | 53 |
| 43 | 720 | 5.30 | 2.90 | 805 | 6.22 | 21.2 | 20.7 | 51 |
| 44 | 720 | 5.33 | 2.90 | 805 | 6.22 | 21.4 | 20.7 | 51 |
| 45 | 720 | 4.97 | 3.45 | 805 | 4.83 | 22.1 | 15.9 | 41 |
| 46 | 720 | 5.36 | 2.90 | 805 | 6.22 | 21.6 | 20.7 | 53 |
| 47 | 720 | 5.20 | 3.00 | 805 | 5.32 | 21.1 | 16.7 | 49 |
| 48 | 720 | 5.17 | 3.00 | 805 | 5.32 | 20.8 | 16.7 | 49 |

TABLE 5

| | Cooling and ceiling | | |
|---|---|---|---|
| No. | Average cooling rate from 800° C. to 450° C. (° C./s) | Average cooling rate from 450° C. to coiling temperature (° C./s) | Coiling temperature (° C.) |
| 1 | 90 | 100 | 20 |
| 2 | 100 | 80 | 50 |
| 3 | 90 | 70 | 100 |
| 4 | 90 | 150 | 20 |
| 5 | 100 | 80 | 20 |
| 6 | 100 | 80 | 20 |
| 7 | 100 | 80 | 20 |
| 8 | 100 | 100 | 200 |
| 9 | 100 | 100 | 20 |
| 10 | 100 | 100 | 20 |
| 11 | 90 | 100 | 50 |
| 12 | 100 | 120 | 50 |
| 13 | 90 | 120 | 50 |
| 14 | 100 | 80 | 20 |
| 15 | 90 | 100 | 20 |
| 16 | 120 | 90 | 20 |
| 17 | 120 | 100 | 20 |
| 18 | 120 | 110 | 50 |
| 19 | 120 | 100 | 20 |
| 20 | 120 | 100 | 20 |
| '21 | 90 | 40 | 20 |
| 22 | 90 | 80 | 450 |
| 23 | 120 | 100 | 20 |
| 24 | 90 | 80 | 20 |
| 25 | 90 | 80 | 20 |
| 26 | 110 | 80 | 20 |
| 27 | 90 | 100 | 200 |
| 28 | 90 | 80 | 20 |
| 29 | 110 | 80 | 50 |
| 30 | 90 | 100 | 20 |
| 31 | 110 | 60 | 50 |
| 32 | 90 | 80 | 50 |
| 33 | 90 | 80 | 50 |
| 34 | 90 | 90 | 50 |
| 35 | 110 | 61 | 50 |
| 36 | 110 | 61 | 50 |
| 37 | 90 | 60 | 50 |
| 38 | 50 | 60 | 20 |
| 39 | 100 | 80 | 20 |
| 40 | 100 | 80 | 20 |
| 41 | 90 | 80 | 20 |
| 42 | 90 | 80 | 20 |
| 43 | 100 | 90 | 50 |
| 44 | 100 | 90 | 50 |
| 45 | 90 | 90 | 20 |
| 46 | 100 | 80 | 50 |
| 47 | 90 | 70 | 320 |
| 48 | 90 | 100 | 20 |

TABLE 6

| | Calculation value using condition equation | | | Light rolling reduction | Heat treatment | | |
|---|---|---|---|---|---|---|---|
| No. | $FT_1$* | $FT_2$* | Texture forming parameter Θ | Rolling reduction (%) | Average temperature rising rate from 200° C. to 450° C. (° C./s) | Heating temperature (° C.) | Retention time (s) |
| 1 | 55 | 16 | 57 | 0 | 10 | 650 | 100 |
| 2 | 50 | 15 | 67 | 0 | 5 | 700 | 200 |
| 3 | 61 | 15 | 56 | 0 | 20 | 600 | 200 |
| 4 | 67 | 14 | 57 | 0 | 20 | 650 | 200 |
| 5 | 72 | 22 | 48 | 0 | 25 | 650 | 200 |
| 6 | 833 | 189 | 5 | 0 | 25 | 650 | 200 |
| 7 | 102 | 24 | 39 | 0 | 30 | 650 | 250 |
| 8 | 52 | 14 | 69 | 0 | 15 | 700 | 30 |
| 9 | 84 | 20 | 46 | 0 | 20 | 650 | 100 |
| 10 | 65 | 16 | 59 | 0 | 25 | 550 | 200 |
| 11 | 69 | 17 | 55 | 0 | 25 | 650 | 250 |
| 12 | 69 | 19 | 49 | 0 | 30 | 650 | 250 |
| 13 | 79 | 17 | 53 | 0 | 30 | 650 | 250 |
| 14 | 56 | 16 | 61 | 0 | 10 | 650 | 300 |
| 15 | 54 | 16 | 68 | 0 | 15 | 650 | 200 |
| 16 | 56 | 14 | 57 | 0 | 20 | 650 | 200 |
| 17 | 56 | 15 | 45 | 0 | 30 | 650 | 200 |
| 18 | 42 | 22 | 57 | 0 | 30 | 650 | 200 |
| 19 | 64 | 13 | 59 | 0 | 20 | 650 | 200 |
| 20 | 43 | 13 | 63 | 0 | 30 | 600 | 200 |
| 21 | 44 | 10 | 72 | 0 | 30 | 600 | 200 |
| 22 | 67 | 24 | 43 | 0 | 10 | 600 | 200 |
| 23 | 39 | 9 | 84 | 0 | 2 | 650 | 150 |

TABLE 6-continued

| | Calculation value using condition equation | | | Light rolling reduction | Heat treatment | | |
|---|---|---|---|---|---|---|---|
| No. | $FT_1$* | $FT_2$* | Texture forming parameter $\Theta$ | Rolling reduction (%) | Average temperature rising rate from 200° C. to 450° C. (° C./s) | Heating temperature (° C.) | Retention time (s) |
| 24 | 57 | 16 | 54 | 0 | 10 | 400 | 300 |
| 25 | 57 | 16 | 53 | 0 | 10 | 650 | 5 |
| 26 | 57 | 7 | 150 | 0 | 10 | 650 | 300 |
| 27 | 25 | 5 | 224 | 0 | 5 | 650 | 200 |
| 28 | 21 | 4 | 146 | 0 | 10 | 650 | 200 |
| 29 | 44 | 12 | 89 | 0 | 5 | 700 | 200 |
| 30 | 43 | 12 | 59 | 0 | 5 | 700 | 200 |
| 31 | 57 | 18 | 64 | 5 | 5 | 700 | 200 |
| 32 | 54 | 14 | 74 | 20 | 5 | 700 | 200 |
| 33 | 67 | 14 | 58 | 0 | 5 | 600 | 200 |
| 34 | 67 | 20 | 48 | 0 | 5 | 650 | 200 |
| 35 | 56 | 18 | 55 | 0 | 5 | 650 | 200 |
| 36 | 65 | 21 | 48 | 0 | 5 | 650 | 200 |
| 37 | 67 | 19 | 50 | 0 | 5 | 650 | 200 |
| 38 | 66 | 19 | 50 | 0 | 5 | 650 | 200 |
| 39 | 86 | 16 | 55 | 0 | 10 | 650 | 200 |
| 40 | 77 | 27 | 39 | 0 | 5 | 650 | 200 |
| 41 | 67 | 18 | 52 | 0 | 5 | 650 | 200 |
| 42 | 65 | 16 | 62 | 0 | 5 | 650 | 200 |
| 43 | 70 | 17 | 56 | 0 | 10 | 650 | 250 |
| 44 | 68 | 18 | 54 | 0 | 15 | 650 | 250 |
| 45 | 52 | 12 | 63 | 0 | 20 | 650 | 200 |
| 46 | 49 | 15 | 68 | 0 | — | — | — |
| 47 | 55 | 15 | 58 | 0 | 10 | 650 | 100 |
| 48 | 61 | 18 | 50 | 0 | 10 | 600 | 100 |

For the obtained hot-rolled steel sheets, the volume percentages of tempered martensite and other phases were obtained by microstructural observation.

Regarding the volume percentages of pearlite, bainite, tempered martensite, and ferrite, a sample was collected such that a sheet thickness cross section parallel to a rolling direction of the hot-rolled steel sheet served as an observed section, the observed section was polished and Nital-etched, 10 visual fields were selected from a range of ⅛ to ⅜ of the sheet thickness (⅛ thickness to ⅜ thickness) from the surface in which a position of a ¼ depth of the steel thickness (¼ thickness) from the surface was centered using a field emission scanning electron microscope (FE-SEM) at a magnification of 5000 times, the area ratios of the individual structures obtained in the individual visual fields were averaged, and the average values were regarded as the volume percentages.

In addition, the volume percentage of fresh martensite was obtained as a difference between the volume percentage obtained as the area ratio of a non-etched region that was observed with the FE-SEM and the volume percentage of residual austenite measured by an X-ray diffraction method.

The volume percentage of the residual austenite was obtained by, in a cross section parallel to the rolling direction at the ¼ depth position of the sheet thickness of the steel sheet, obtaining the integrated intensities of a total of six peaks of $\alpha(110)$, $\alpha(200)$, $\alpha(211)$, $\gamma(111)$, $\gamma(200)$, and $\gamma(220)$ using Co-K$\alpha$ rays and performing calculation using an intensity averaging method.

In addition, for the obtained hot-rolled steel sheets, the number densities per unit volume of precipitates containing Ti and having an equivalent circle diameter of 5 nm or less were obtained. At that time, a test piece was collected from the vicinity of a ¼ position of the sheet thickness (¼ thickness) from the surface, the number densities of precipitates that were included per unit volume of the steel sheet were obtained using an electrolytic extraction residual method for individual equivalent circle diameters at pitches of 1.0 nm, and the number density of precipitates containing Ti and having an equivalent circle diameter of 5 nm or less was obtained. At the time of the measurement, the compositions of precipitates were analyzed with a transmission electron microscope (TEM) and EDS to confirm that fine precipitates were precipitates containing Ti.

In addition, a tensile test was performed according to JIS Z 2241: 2011 using a JIS No. 5 test piece collected from a ¼ position in the width direction of the hot-rolled steel sheet such that a direction perpendicular to a rolling direction (C direction) became the longitudinal direction, and the 0.2% proof stress YS (Ma), the tensile strength TS (MPa), and the total elongation (EL) were obtained.

In addition, a 100 mm×30 mm strip-shaped test piece was cut out from a ½ position in the width direction of the obtained hot-rolled steel sheet and subjected to a bending test. For both a bend where the bending ridge was parallel to the rolling direction (L direction) (L-axis bending) and a bend where the bending ridge was parallel to a direction perpendicular to the rolling direction (C direction) (C-axis bending), bending workability was investigated according to Z 2248: 2006 (V block 90° bending test), the minimum bend radii at which cracks were not initiated were obtained, and a value obtained by dividing the average value of the minimum bend radii in the L axis and in the C axis by the sheet thickness was regarded as the limit bend R/t and used as an index value of bendability.

Here, regarding the presence or absence of cracks, a cross section obtained by cutting the test piece after the V block 90° bending test on a surface parallel to the bending direction and perpendicular to the sheet surface was mirror-polished, then, cracks were observed with an optical microscope, and a case where the lengths of cracks observed in the inside bend of the test piece exceeded 30 μm was determined as cracks being present.

In addition, from the obtained hot-rolled steel sheet, a test piece was cut out from a ¼ width position in the width direction of the steel sheet according to JIS Z 2256: 2010 and punched using a punch having a diameter of 10 mm and a die having an inner diameter of 10.6 mm. After that, the test piece was set such that burrs in the punched portion were present on the opposite side to a 60° conical punch, and hole expanding was performed using the punch. The test was stopped when cracks initiated in the punched portion penetrated the sheet thickness, and the hole diameter after the hole expanding test was measured, thereby obtaining the hole expanding rate L.

In addition, nanohardness was measured at a total of 100 places at intervals of 3 μm on lines perpendicular to the sheet thickness direction and parallel to the rolling direction at the ¼ thickness position of the obtained hot-rolled steel sheet using tribo-900 manufactured by Hysitron Inc. under a condition of an indentation depth of 80 nm with a diamond indenter with a Berkovich shape, and the standard deviation was obtained from the histogram of the obtained nanohardness.

The individual results are shown in Table 7 to Table 9. Regarding the microstructural fractions in Table 7 and Table 8, t-M indicates tempered martensite, α indicates ferrite. P indicates pearlite. B indicates bainite, FM indicates fresh martensite, and γ indicates residual austenite.

TABLE 7

| No. | Plating type | Sum of average pole density of crystal orientation group consisting of {211} <111> to {111} <112> and pole density in crystal orientation of {110} <001> | Microstructural fraction (vol %) | | |
|---|---|---|---|---|---|
| | | | t-M | α | P |
| 1 | GA | 5.2 | 89.5 | 5.0 | 0.0 |
| 2 | GA | 5.7 | 100.0 | 0.0 | 0.0 |
| 3 | Non plating | 5.1 | 85.2 | 7.0 | 0.0 |
| 4 | GA | 4.8 | 95.8 | 2.0 | 0.0 |
| 5 | GA | 5.7 | 69.5 | 15.0 | 0.0 |
| 6 | GA | 2.5 | 84.0 | 8.0 | 0.0 |
| 7 | GA | 3.7 | 84.2 | 7.0 | 0.0 |
| 8 | Non plating | 4.2 | 91.0 | 4.0 | 0.0 |
| 9 | GI | 4.9 | 94.0 | 3.0 | 0.0 |
| 10 | GA | 4.6 | 81.5 | 2.0 | 0.0 |
| 11 | GA | 4.7 | 90.4 | 5.0 | 0.0 |
| 12 | GA | 4.1 | 91.5 | 4.0 | 0.0 |
| 13 | GA | 4.1 | 88.7 | 5.0 | 0.0 |
| 14 | GA | 5.6 | 90.5 | 4.0 | 0.0 |
| 15 | GA | 4.5 | 89.5 | 5.0 | 0.0 |
| 16 | GI | 4.8 | 90.6 | 5.0 | 0.0 |
| 17 | GA | 4.3 | 90.3 | 6.0 | 0.0 |
| 18 | GA | 5.6 | 90.4 | 5.0 | 0.0 |
| 19 | GA | 5.0 | 87.6 | 6.0 | 0.0 |
| 20 | GA | 5.2 | 89.6 | 5.0 | 0.0 |
| 21 | GA | 5.0 | 81.5 | 10.0 | 0.0 |
| 22 | GA | 4 5 | 64 5 | 5 0 | 0 0 |
| .23 | GA | 5.3 | 90.4 | 5.0 | 0.0 |
| 24 | GA | 5.6 | 90.5 | 4.0 | 0.0 |
| 25 | GA | 5.6 | 89.5 | 5.0 | 0.0 |
| 26 | GA | 6.1 | 93.5 | 3.0 | 0.0 |
| 27 | GA | 6.5 | 97.0 | 2.0 | 0.0 |

TABLE 7-continued

| No. | Plating type | Sum of average pole density of crystal orientation group consisting of {211} <111> to {111} <112> and pole density in crystal orientation of {110} <001> | Microstructural fraction (vol %) | | |
|---|---|---|---|---|---|
| | | | t-M | α | P |
| 28 | GA | 6.3 | 97.9 | 1.0 | 0.0 |
| 29 | GA | 5.7 | 100.0 | 0.0 | 0.0 |
| 30 | GA | 5.7 | 100.0 | 0.0 | 0.0 |
| 31 | GA | 5.7 | 85.0 | 10.0 | 0.0 |
| 32 | GA | 5.7 | 100.0 | 0.0 | 0.0 |
| 33 | GA | 6.2 | 98.0 | 0.0 | 0.0 |
| 34 | GA | 4.9 | 91.7 | 3.0 | 0.0 |
| 35 | GA | 5.1 | 90.7 | 4.0 | 0.0 |
| 36 | GA | 5.0 | 91.6 | 4.0 | 0.0 |
| 37 | GA | 5.0 | 92.7 | 3.0 | 0.0 |
| 38 | GA | 5.1 | 92.7 | 3.0 | 0.0 |
| 39 | GA | 6.2 | 90.5 | 4.5 | 0.0 |
| 40 | GA | 6.3 | 91.5 | 4.0 | 0.0 |
| 41 | GA | 6.3 | 90.9 | 4.5 | 0.0 |
| 42 | GA | 6.2 | 90.9 | 5.0 | 0.0 |
| 43 | GA | 4.8 | 90.0 | 5.0 | 0.0 |
| 44 | GA | 4.8 | 91.0 | 4.5 | 0.0 |
| 45 | GA | 6.3 | 90.9 | 4.5 | 0.0 |
| 46 | Non plating | 5.6 | 50.0 | 0.0 | 0.0 |
| 47 | GA | 5.2 | 78.0 | 0.0 | 0.0 |
| 48 | GA | 5.1 | 82.5 | 7.0 | 0.0 |

TABLE 8

| No. | Microstructural fraction (vol %) | | | Number density of fine precipitates (1/mm$^3$) | Nanohardness standard deviation (GPa) |
|---|---|---|---|---|---|
| | B | FM | γ | | |
| 1 | 5.0 | 00 | 0.5 | $2 \times 10^{10}$ | 0.4 |
| 2 | 0.0 | 0.0 | 0.0 | $3 \times 10^{10}$ | 0.5 |
| 3 | 7.0 | 0.0 | 0.8 | $2 \times 10^{10}$ | 0.5 |
| 4 | 2.0 | 0.0 | 0.2 | $6 \times 10^{10}$ | 0.3 |
| 5 | 15.0 | 0.0 | 0.5 | $2 \times 10^{10}$ | 0.9 |
| 6 | 7.0 | 0.0 | 1.0 | $7 \times 10^{8}$ | 0.4 |
| 7 | 8.0 | 0.0 | 0.8 | $1 \times 10^{9}$ | 05 |
| 8 | 4.0 | 00 | 1.0 | $6 \times 10^{10}$ | 0.5 |
| 9 | 3.0 | 0.0 | 0.0 | $3 \times 10^{10}$ | 0.4 |
| 10 | 13.0 | 3.0 | 0.5 | $2 \times 10^{10}$ | 0.4 |
| 11 | 4.0 | 0.0 | 0.6 | $2 \times 10^{10}$ | 0.5 |
| 12 | 4.0 | 0 0 | 0.5 | $1 \times 10^{10}$ | 0,5 |
| 13 | 6.0 | 0.0 | 0.3 | $2 \times 10^{10}$ | 0.5 |
| 14 | 5.0 | 0.0 | 0.5 | $5 \times 10^{10}$ | 0.4 |
| 15 | 5.0 | 00 | 0.5 | $4 \times 10^{10}$ | 0.5 |
| 16 | 4.0 | 0.0 | 0.4 | $4 \times 10^{10}$ | 0.5 |
| 17 | 3.0 | 0.0 | 0.7 | $5 \times 10^{10}$ | 0.5 |
| 18 | 4.0 | 0.0 | 0.6 | $5 \times 10^{10}$ | 0.4 |
| 19 | 6.0 | 0 0 | 0.4 | $4 \times 10^{9}$ | 0.4 |
| 20 | 5.0 | 0.0 | 0.4 | $3 \times 10^{9}$ | 0.4 |
| 21 | 8.0 | 0.0 | 0.5 | $6 \times 10^{9}$ | 0.9 |
| 22 | 30.0 | 0.0 | 0.5 | $2 \times 10^{9}$ | 0.9 |
| 23 | 4.0 | 0.0 | 0.6 | $8 \times 10^{9}$ | 0.9 |
| 24 | 5.0 | 0.0 | 0.5 | $3 \times 10^{9}$ | 0.7 |
| 25 | 5.0 | 0.0 | 0.5 | $4 \times 10^{9}$ | 0.7 |
| 26 | 3.0 | 0.0 | 0.5 | $5 \times 10^{10}$ | 0.6 |
| 27 | 1.0 | 0.0 | 0.0 | $2 \times 10^{10}$ | 0.5 |
| 28 | 1.0 | 0.0 | 0.1 | $2 \times 10^{10}$ | 0.5 |
| 29 | 0.0 | 0.0 | 0.0 | $3 \times 10^{10}$ | 0.5 |
| 30 | 0.0 | 0.0 | 0.0 | $3 \times 10^{10}$ | 0.5 |
| 31 | 5.0 | 0.0 | 0.0 | $6 \times 10^{11}$ | 0.5 |
| 32 | 0.0 | 0.0 | 0.0 | $7 \times 10^{11}$ | 0.5 |
| 33 | 2.0 | 0.0 | 0.0 | $3 \times 10^{10}$ | 0.6 |
| 34 | 5.0 | 0.0 | 0.3 | $4 \times 10^{10}$ | 0.5 |

TABLE 8-continued

| No. | Microstructural fraction (vol %) B | FM | γ | Number density of fine precipitates (1/mm³) | Nanohardness standard deviation (GPa) |
|---|---|---|---|---|---|
| 35 | 5.0 | 0.0 | 0.3 | 4 × 10¹⁰ | 0.5 |
| 36 | 4.0 | 0.0 | 0.4 | 5 × 10¹⁰ | 0.4 |
| 37 | 4.0 | 00 | 0.3 | 5 × 10¹⁰ | 0.5 |
| 38 | 4.0 | 0.0 | 0.3 | 2 × 10¹⁰ | 0.9 |
| 39 | 4.5 | 0.0 | 0.5 | 5 × 10¹⁰ | 0.4 |
| 40 | 4.0 | 0.0 | 0.5 | 5 × 10¹⁰ | 0.5 |
| 41 | 4.0 | 0.0 | 0.6 | 4 × 10¹⁰ | 0.5 |
| 42 | 3.5 | 0.0 | 0.6 | 4 × 10¹⁰ | 0.5 |
| 43 | 4.5 | 0.0 | 0.5 | 2 × 10¹⁰ | 0.5 |
| 44 | 4.0 | 00 | 0.5 | 2 × 10¹⁰ | 0.5 |
| 45 | 4.0 | 0.0 | 0.6 | 4 × 10¹⁰ | 0.5 |
| 46 | 0.0 | 0.0 | 50.0 | 7 × 10⁸ | 0.9 |
| 47 | 21.5 | 0.0 | 0.5 | 2 × 10⁹ | 0.9 |
| 48 | 10.0 | 0.0 | 0.5 | 3 × 10¹⁰ | 0.4 |

TABLE 9

| | Mechanical properties | | | | | | | |
|---|---|---|---|---|---|---|---|---|
| No. | 0.2% proof stress YS (MPa) | Tensile strength TS (MPA) | YS/TS | Total elongation EL (%) | Limit bend R/t | Hole expanding rate λ (%) | TS × λ (MPa · %) | Note |
| 1 | 1000 | 1048 | 0.95 | 14 | 1.0 | 60 | 62880 | Invention Example |
| 2 | 1085 | 1110 | 0.98 | 12 | 1.0 | 45 | 49950 | Invention Example |
| 3 | 985 | 1005 | 0.98 | 16 | 1.0 | 71 | 71355 | Invention Example |
| 4 | 1100 | 1112 | 0.99 | 15 | 1.0 | 55 | 61160 | Invention Example |
| 5 | 840 | 940 | 0.89 | 21 | 2.2 | 35 | 32900 | Comparative Example |
| 6 | 828 | 942 | 0.88 | 20 | 1.0 | 55 | 51810 | Comparative Example |
| 7 | 832 | 955 | 0.87 | 19 | 1.1 | 52 | 49660 | Comparative Example |
| 8 | 1155 | 1169 | 0.99 | 12 | 1.0 | 47 | 54943 | Invention Example |
| 9 | 1023 | 1050 | 0.97 | 13 | 1.0 | 45 | 47250 | Invention Example |
| 10 | 1065 | 1177 | 0.90 | 12 | 1.1 | 43 | 50611 | Invention Example |
| 11 | 976 | 1020 | 0.96 | 14 | 1.0 | 45 | 45900 | Invention Example |
| 12 | 1001 | 1032 | 0.97 | 14 | 1.0 | 47 | 48504 | Invention Example |
| 13 | 1004 | 1033 | 0.97 | 13 | 1.0 | 44 | 45452 | Invention Example |
| 14 | 1002 | 1046 | 0.96 | 14 | 1.1 | 49 | 51254 | Invention Example |
| 15 | 1010 | 1055 | 0.96 | 14 | 1.0 | 65 | 68575 | Invention Example |
| 16 | 1030 | 1039 | 0.99 | 15 | 1.0 | 63 | 65457 | Invention Example |
| 17 | 1015 | 1044 | 0.97 | 14 | 1.0 | 64 | 66816 | Invention Example |
| 18 | 1018 | 1036 | 0.98 | 14 | 1.1 | 51 | 52836 | Invention Example |
| 19 | 900 | 960 | 0.94 | 15 | 1.1 | 60 | 57600 | Comparative Example |
| 20 | 902 | 968 | 0.93 | 15 | 1.1 | 60 | 58080 | Comparative Example |
| 21 | 1002 | 1050 | 0.95 | 14 | 1.4 | 38 | 39900 | Invention Example |
| 22 | 903 | 940 | 0.96 | 16 | 2.3 | 35 | 32900 | Comparative Example |
| 23 | 946 | 995 | 0.95 | 13 | 1.4 | 39 | 38805 | Invention Example |
| 24 | 840 | 943 | 0.89 | 12 | 1.2 | 38 | 35834 | Comparative Example |
| 25 | 908 | 955 | 0.95 | 13 | 1.2 | 39 | 37245 | Comparative Example |
| 26 | 1002 | 1046 | 0.96 | 14 | 2.2 | 33 | 34518 | Comparative Example |
| 27 | 1123 | 1160 | 0.97 | 11 | 2.2 | 29 | 33640 | Comparative Example |
| 28 | 1113 | 1116 | 0.97 | 11 | 2.2 | 30 | 34380 | Comparative Example |
| 29 | 1085 | 1110 | 0.98 | 12 | 1.1 | 40 | 44400 | Invention Example |
| 30 | 1083 | 1111 | 0.97 | 12 | 1.0 | 40 | 44440 | Invention Example |
| 31 | 1167 | 1220 | 0.96 | 12 | 1.0 | 45 | 54900 | Invention Example |
| 32 | 1183 | 1251 | 0.95 | 12 | 1.0 | 45 | 56295 | Invention Example |
| 33 | 1078 | 1132 | 0.95 | 12 | 2.2 | 29 | 32828 | Comparative Example |
| 34 | 1033 | 1055 | 0.98 | 13 | 1.0 | 46 | 48530 | Invention Example |
| 35 | 1036 | 1050 | 0.99 | 12 | 1.0 | 45 | 47250 | Invention Example |
| 36 | 1027 | 1061 | 0.97 | 12 | 1.0 | 45 | 47745 | Invention Example |
| 37 | 1029 | 1057 | 0.97 | 13 | 1.0 | 46 | 48622 | Invention Example |
| 38 | 956 | 989 | 0.97 | 13 | 1.4 | 36 | 35604 | Invention Example |
| 39 | 986 | 1033 | 0.95 | 14 | 2.2 | 46 | 47518 | Comparative Example |
| 40 | 999 | 1030 | 0.97 | 14 | 2.3 | 47 | 48410 | Comparative Example |
| 41 | 998 | 1031 | 0.97 | 14 | 2.2 | 48 | 49488 | Comparative Example |
| 42 | 988 | 1025 | 0.96 | 13 | 2.3 | 45 | 46125 | Comparative Example |
| 43 | 973 | 1019 | 0.95 | 14 | 1.0 | 45 | 45855 | Invention Example |
| 44 | 970 | 1025 | 0.95 | 14 | 1.1 | 43 | 44075 | Invention Example |
| 45 | 1015 | 1035 | 0.98 | 14 | 2.3 | 56 | 57960 | Comparative Example |
| 46 | 890 | 1040 | 0.86 | 10 | 2.2 | 42 | 43680 | Comparative Example |
| 47 | 910 | 1010 | 0.90 | 15 | 2.2 | 43 | 43430 | Comparative Example |
| 48 | 910 | 990 | 0.92 | 15 | 1.0 | 55 | 54450 | Invention Example |

As is clear from Table 1 to Table 9, Nos. 1 to 4, 8 to 18, 21, 23, 29 to 32, 34 to 38, 43, 44, and 48, which were the present invention examples, had a tensile strength of 980 MPa or more, were excellent in terms of bending workability and stretch flangeability, and furthermore, had a high proof stress.

On the other hand, in Comparative Examples Nos. 5 to 7, 19, 20, 22, 24 to 28, 33, 39 to 42, and 45 to 47 in which one or more of the chemical composition, the microstructure, the presence state of precipitates, and the texture in the surface layer area were outside the scope of the present invention, any of the tensile strength, the bending workability, the stretch flangeability, and the proof stress failed to reach the target values.

INDUSTRIAL APPLICABILITY

According to the present invention, it is possible to obtain a hot-rolled steel sheet that has a tensile strength of 980 MPa or more, is capable of suppressing the initiation of inside bend cracks, is excellent in terms of bending workability and stretch flangeability, and furthermore, has a high proof stress (the proportion of proof stress in tensile strength is high).

The invention claimed is:

1. A hot-rolled steel sheet comprising, as a chemical composition, by mass %:
   C: 0.02% to 0.12%;
   Si: 0.01% to 2.00%;
   Mn: 1.00% to 3.00%;
   P: 0.100% or less;
   S: 0.010% or less;
   N: 0.010% or less;
   Al: 0.005% to 1.000%;
   Ti: 0.01% to 0.20%;
   Nb: 0% to 0.10%;
   V: 0% to 0.100%;
   Ni: 0% to 2.00%;
   Cu: 0% to 2.00%;
   Cr: 0% to 2.00%;
   Mo: 0% to 2.00%;
   W: 0% to 0.100%;
   B: 0% to 0.0100%;
   REM: 0% to 0.0300%;
   Ca: 0% to 0.0300%;
   Mg: 0% to 0.0300%; and
   a remainder of Fe and impurities,
   wherein the chemical composition satisfies $0.10 \leq Ti+Nb+V \leq 0.45$,
   a microstructure includes 80% or more of tempered martensite by a volume percentage, a remainder consists of one or more of ferrite, pearlite, bainite, fresh martensite, and residual austenite,
   the tempered martensite includes $5 \times 10^9$ pieces/mm$^3$ or more of precipitates containing Ti and having an equivalent circle diameter of 5 nm or less per unit volume,
   in a surface layer region that is a range from a surface to a 1/10 position of a sheet thickness, a sum of an average pole density of a crystal orientation group consisting of {211}<111> to {111}<112> and a pole density in a crystal orientation of {110}<001> is 6.0 or less, and
   a tensile strength is 980 MPa or more.

2. The hot-rolled steel sheet according to claim 1, comprising, as the chemical composition, by mass %, one or more selected from:
   Nb: 0.01% to 0.10%;
   V: 0.010% to 0.100%;
   Ni: 0.01% to 2.00%;
   Cu: 0.01% to 2.00%;
   Cr: 0.01% to 2.00%;
   Mo: 0.01% to 2.00%;
   W: 0.005% to 0.100%;
   B: 0.0005% to 0.0100%;
   REM: 0.0003% to 0.0300%;
   Ca: 0.0003% to 0.0300%; and
   Mg: 0.0003% to 0.0300%.

3. The hot-rolled steel sheet according to claim 1, wherein the tempered martensite includes $5 \times 10^{11}$ pieces/mm$^3$ or more of the precipitates per unit volume, and the tensile strength is 1180 MPa or more.

4. The hot-rolled steel sheet according to claim 2, wherein the tempered martensite includes $5 \times 10^{11}$ pieces/mm$^3$ or more of the precipitates per unit volume, and the tensile strength is 1180 MPa or more.

5. The hot-rolled steel sheet according to claim 1, wherein a standard deviation of nanohardness at a 1/4 position of the sheet thickness from the surface is 0.8 GPa or less.

6. The hot-rolled steel sheet according to claim 2, wherein a standard deviation of nanohardness at a 1/4 position of the sheet thickness from the surface is 0.8 GPa or less.

7. The hot-rolled steel sheet according to claim 3, wherein a standard deviation of nanohardness at a 1/4 position of the sheet thickness from the surface is 0.8 GPa or less.

8. The hot-rolled steel sheet according to claim 4, wherein a standard deviation of nanohardness at a 1/4 position of the sheet thickness from the surface is 0.8 GPa or less.

9. The hot-rolled steel sheet according to claim 1, wherein a hot-dip galvanized layer is provided on the surface.

10. The hot-rolled steel sheet according to claim 2, wherein a hot-dip galvanized layer is provided on the surface.

11. The hot-rolled steel sheet according to claim 3, wherein a hot-dip galvanized layer is provided on the surface.

12. The hot-rolled steel sheet according to claim 4, wherein a hot-dip galvanized layer is provided on the surface.

13. The hot-rolled steel sheet according to claim 5, wherein a hot-dip galvanized layer is provided on the surface.

14. The hot-rolled steel sheet according to claim 9, wherein the hot-dip galvanized layer is a hot-dip galvannealed layer.

15. The hot-rolled steel sheet according to claim 10, wherein the hot-dip galvanized layer is a hot-dip galvannealed layer.

16. The hot-rolled steel sheet according to claim 11, wherein the hot-dip galvanized layer is a hot-dip galvannealed layer.

17. The hot-rolled steel sheet according to claim 12, wherein the hot-dip galvanized layer is a hot-dip galvannealed layer.

18. The hot-rolled steel sheet according to claim 13, wherein the hot-dip galvanized layer is a hot-dip galvannealed layer.

19. A hot-rolled steel sheet comprising, as a chemical composition, by mass %:
   C: 0.02% to 0.12%;
   Si: 0.01% to 2.00%;

Mn: 1.00% to 3.00%;
P: 0.100% or less;
S: 0.010% or less;
N: 0.010% or less;
Al: 0.005% to 1.000%;
Ti: 0.01% to 0.20%;
Nb: 0% to 0.10%;
V: 0% to 0.100%;
Ni: 0% to 2.00%;
Cu: 0% to 2.00%;
Cr: 0% to 2.00%;
Mo: 0% to 2.00%;
W: 0% to 0.100%;
B: 0% to 0.0100%;
REM: 0% to 0.0300%;
Ca: 0% to 0.0300%;
Mg: 0% to 0.0300%; and
a remainder of Fe and impurities,
wherein the chemical composition satisfies $0.10 \leq Ti+Nb+V \leq 0.45$,
a microstructure includes 80% or more of tempered martensite by a volume percentage, a remainder comprising one or more of ferrite, pearlite, bainite, fresh martensite, and residual austenite,
the tempered martensite includes $5 \times 10^9$ pieces/mm$^3$ or more of precipitates containing Ti and having an equivalent circle diameter of 5 nm or less per unit volume,
in a surface layer region that is a range from a surface to a 1/10 position of a sheet thickness, a sum of an average pole density of a crystal orientation group comprising {211}<111> to {111}<112> and a pole density in a crystal orientation of {110}<001> is 6.0 or less, and
a tensile strength is 980 MPa or more.

* * * * *